United States Patent
Roche et al.

(10) Patent No.: US 12,493,493 B2
(45) Date of Patent: Dec. 9, 2025

(54) METHOD AND SYSTEM FOR ALLOCATING GRAPHICS PROCESSING UNIT PARTITIONS FOR A COMPUTER VISION ENVIRONMENT

(71) Applicant: Dell Products L.P., Round Rock, TX (US)

(72) Inventors: Ian Roche, Glanmire (IE); Philip Hummel, San Jose, CA (US); Dharmesh M. Patel, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 529 days.

(21) Appl. No.: 17/581,399

(22) Filed: Jan. 21, 2022

(65) Prior Publication Data
US 2023/0236887 A1   Jul. 27, 2023

(51) Int. Cl.
*G06F 9/50*   (2006.01)
*G06N 20/00*   (2019.01)

(52) U.S. Cl.
CPC .......... *G06F 9/5016* (2013.01); *G06F 9/5022* (2013.01); *G06F 9/5033* (2013.01); *G06F 9/5044* (2013.01); *G06F 9/505* (2013.01); *G06N 20/00* (2019.01)

(58) Field of Classification Search
USPC ........................................................ 718/104
See application file for complete search history.

(56) References Cited

U.S. PATENT DOCUMENTS

| | | | |
|---|---|---|---|
| 10,699,364 B2* | 6/2020 | Suresh | G06F 9/5044 |
| 2010/0217949 A1* | 8/2010 | Schopp | G06F 9/5077 |
| | | | 711/E12.002 |
| 2018/0218473 A1* | 8/2018 | Hoppert | G06F 9/45529 |
| 2022/0004463 A1* | 1/2022 | Narayanan | G06F 11/1451 |
| 2022/0067546 A1* | 3/2022 | Amrani | G06V 10/764 |

(Continued)

OTHER PUBLICATIONS

Houssam-Eddine Zahaf, "Contention-Aware GPU Partitioning and Task-to-Partition Allocation for Real-Time Workloads", Apr. 7, 2021, ACM ISBN (Year: 2021).*

(Continued)

*Primary Examiner* — April Y Blair
*Assistant Examiner* — Ross Michael Vincent
(74) *Attorney, Agent, or Firm* — Chamberlain, Hrdlicka, White, Williams & Aughtry; Aly Z. Dossa

(57) ABSTRACT

Techniques described herein relate to a method for allocating graphics processing unit partitions for a computer vision environment. The method includes obtaining, by a computer vision (CV) manager, an initial graphics processing unit (GPU) partition allocation request associated with a CV workload; in response to obtaining the initial GPU partition allocation request: obtaining CV workload information associated with the CV workload; obtaining first CV environment configuration information associated with the GPU partition allocation request; generating an optimal GPU partition allocation based on the first CV environment configuration information and the CV workload information using a GPU partition model; and initiating performance of the CV workload in a CV environment based on the optimal GPU partition allocation.

8 Claims, 11 Drawing Sheets

(56) References Cited

U.S. PATENT DOCUMENTS

| | | | |
|---|---|---|---|
| 2023/0041508 A1* | 2/2023 | Croxford | G06F 12/0223 |
| 2023/0144662 A1* | 5/2023 | Tasinga | G06F 9/5088 |
| | | | 718/105 |
| 2023/0177425 A1* | 6/2023 | Coady | G06Q 10/063112 |
| | | | 705/7.23 |
| 2023/0229517 A1* | 7/2023 | Kelly | G06F 9/5061 |
| | | | 718/104 |
| 2023/0244537 A1* | 8/2023 | Wang | G06F 9/505 |
| | | | 718/1 |

OTHER PUBLICATIONS

Nvidia, Multi-Instance GPU User Guide, Aug. 2021.

* cited by examiner

METHOD AND SYSTEM FOR ALLOCATING GRAPHICS PROCESSING UNIT PARTITIONS FOR A COMPUTER VISION ENVIRONMENT

BACKGROUND

Computing devices may provide services. To provide the services, the computing devices may include hardware components and software components. The hardware components of the computing devices may be allocated to other computing devices to provide the services. The allocations of the hardware components may affect the efficiency of the computing devices.

SUMMARY

In general, certain embodiments described herein relate to a method for allocating graphics processing unit partitions for a computer vision environment. The method may include obtaining, by a computer vision (CV) manager, an initial graphics processing unit (GPU) partition allocation request associated with a CV workload; in response to obtaining the initial GPU partition allocation request: obtaining CV workload information associated with the CV workload; obtaining first CV environment configuration information associated with the GPU partition allocation request; generating an optimal GPU partition allocation based on the first CV environment configuration information and the CV workload information using a GPU partition model; and initiating performance of the CV workload in a CV environment based on the optimal GPU partition allocation.

In general, certain embodiments described herein relate to a system for allocating graphics processing unit partitions for a computer vision environment. The system includes a computer vision (CV) environment that includes CV nodes and a CV manager, which includes a processor and memory, and is programmed to: obtain an initial graphics processing unit (GPU) partition allocation request associated with a CV workload; in response to obtaining the initial graphics processing unit (GPU) partition allocation request: obtain CV workload information associated with the CV workload; obtain first CV environment configuration information associated with the initial GPU partition allocation request; generate an optimal GPU partition allocation based on the first CV environment configuration information and the CV workload information using a GPU partition model; and initiate performance of the CV workload in the CV environment based on the optimal GPU partition allocation.

In general, certain embodiments described herein relate to a non-transitory computer readable medium that includes computer readable program code, which when executed by a computer processor enables the computer processor to perform a method for allocating graphics processing unit partitions for a computer vision environment. The method may include obtaining, by a computer vision (CV) manager, an initial graphics processing unit (GPU) partition allocation request associated with a CV workload; in response to obtaining the initial GPU partition allocation request: obtaining CV workload information associated with the CV workload; obtaining first CV environment configuration information associated with the GPU partition allocation request; generating an optimal GPU partition allocation based on the first CV environment configuration information and the CV workload information using a GPU partition model; and initiating performance of the CV workload in a CV environment based on the optimal GPU partition allocation.

Other aspects of the embodiments disclosed herein will be apparent from the following description and the appended claims.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

DETAILED DESCRIPTION

Figure 1:
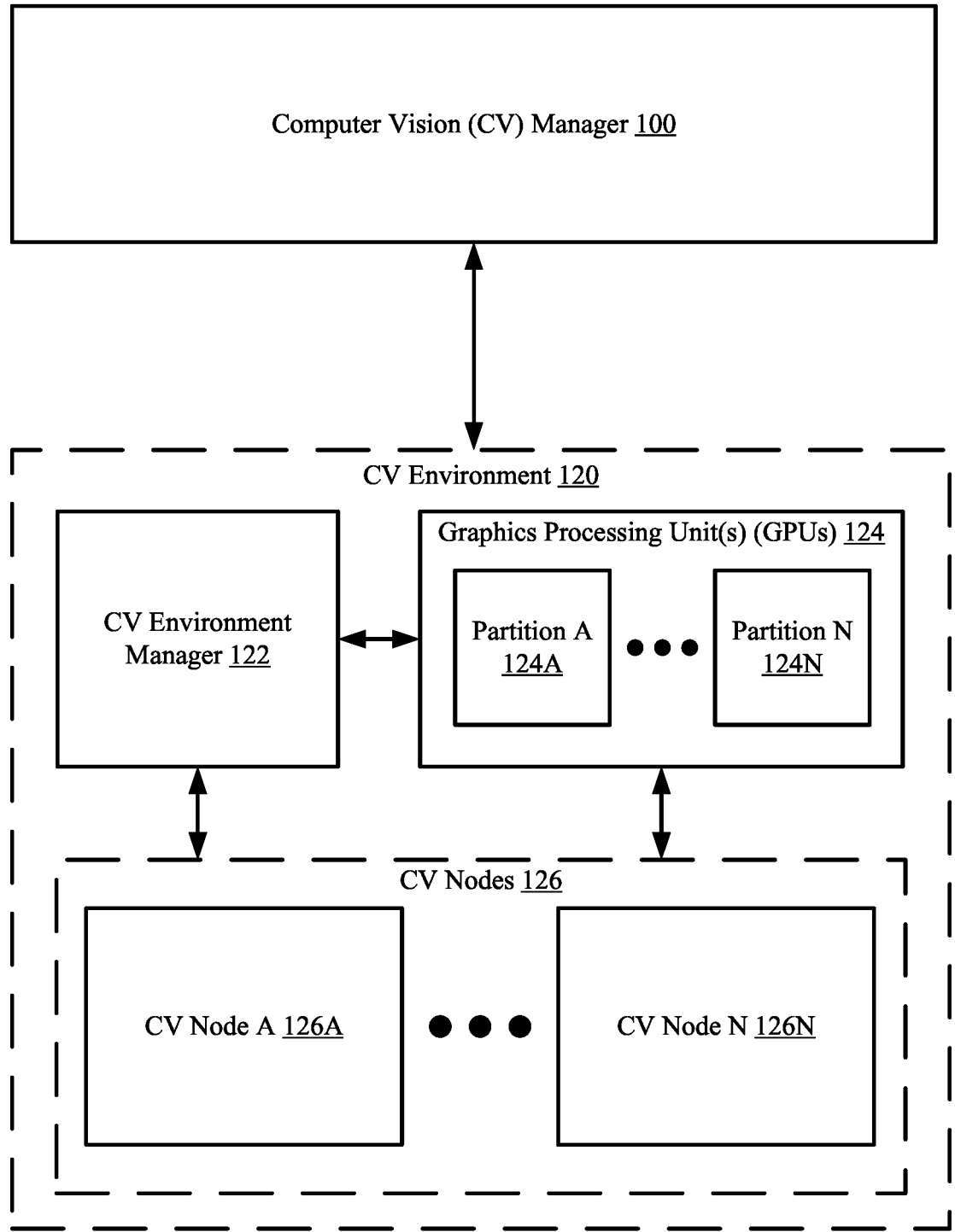
FIG. 1 shows a diagram of a system in accordance with one or more embodiments of the invention.

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, conjunction with, or in place of the embodiments described with regard to a corresponding like-named component in any other figure.

Throughout this application, elements of figures may be labeled as A to N. As used herein, the aforementioned labeling means that the element may include any number of items and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements. The number of elements of the first data structure and the number of elements of the second data structure may be the same or different.

As used herein, an entity that is programmed to perform a function (e.g., step, action, etc.) refers to one or more hardware devices (e.g., processors, digital signal processors, field programmable gate arrays, application specific integrated circuits, etc.) that provide the function. The hardware devices may be programmed to do so by, for example, being able to execute computer instructions (e.g., computer code) that cause the hardware devices to provide the function. In another example, the hardware device may be programmed to do so by having circuitry that has been adapted (e.g., modified) to perform the function. An entity that is programmed to perform a function does not include computer instructions in isolation from any hardware devices. Computer instructions may be used to program a hardware device that, when programmed, provides the function.

In general, embodiments of the invention relate to allocating GPU partitions to CV nodes to execute CV workloads in a CV environment. A CV manager may generate optimal GPU partition allocations to allocate GPU partitions to allocate GPU partitions CV nodes of a CV environment based on CV workload information associated with the CV workloads using a GPU partition model. Additionally, as CV workloads and/or the CV nodes of the CV environment change, the GPU partitions may be dynamically reallocated to CV nodes in real-time. As a result, GPU partitions may be efficiently allocated and reallocated in the CV environment. Therefore, the performance of the CV environment may be optimized and the negative effects a changing CV environment may be reduced.

FIG. 1 shows a diagram of a system in accordance with one or more embodiments of the invention. The system may include a computer vision (CV) manager (100) and a CV environment (120). The system may include other and/or additional devices and/or components without departing from embodiments disclosed herein. The devices and components of the system illustrated in FIG. 1 may be operatively connected via any combinations of wired (e.g., Ethernet) and/or wireless (e.g., WAN) connections without departing from the invention. Each of the components of the system is discussed in more detail below.

In one or more embodiments of the invention, the CV manager (100) includes the functionality to perform power optimization services for the CV environment (120). The CV manager (100) may further include the functionality to perform graphics processing unit (GPU) partitioning services for the CV environment (120). The CV manager (100) may include the functionalities to perform all, or a portion thereof, the methods of FIGS. 3A-3B and FIGS. 5A-5B. The CV manager (100) may include other and/or additional functionalities without departing from the invention. For additional information regarding the CV manager (100), refer to FIG. 2.

In one or more embodiments disclosed herein, CV manager (100) is implemented as a computing device. In one or more embodiments, a computing device is any device, portion of a device, or any set of devices capable of electronically processing instructions and may include any number of components, which include, but are not limited to, any of the following: one or more processors (e.g. components that include integrated circuitry) (not shown), memory (e.g., random access memory (RAM)) (not shown), input and output device(s) (not shown), non-volatile storage hardware (e.g., solid-state drives (SSDs), hard disk drives (HDDs) (not shown)), one or more physical interfaces (e.g., network ports, storage ports) (not shown), any number of other hardware components (not shown), accelerators (e.g., GPUs) (not shown), sensors for obtaining data, and/or any combination thereof.

Examples of computing devices include, but are not limited to, a server (e.g., a blade-server in a blade-server chassis, a rack server in a rack, etc.), a desktop computer, a mobile device (e.g., laptop computer, smart phone, personal digital assistant, tablet computer, automobile computing system, and/or any other mobile computing device), a storage device (e.g., a disk drive array, a fibre/fiber channel storage device, an Internet Small Computer Systems Interface (iSCSI) storage device, a tape storage device, a flash storage array, a network attached storage device, etc.), a network device (e.g., switch, router, multi-layer switch, etc.), a hyperconverged infrastructure, a cluster, a virtual machine, a logical container (e.g., for one or more applications), and/or any other type of device with the aforementioned requirements.

In one or more embodiments, the non-volatile storage (not shown) and/or memory (not shown) of a computing device or system of computing devices may be one or more data repositories for storing any number of data structures storing any amount of data (i.e., information). In one or more embodiments, a data repository is any type of storage unit and/or device (e.g., a file system, database, collection of tables, RAM, and/or any other storage mechanism or medium) for storing data. Further, the data repository may include multiple different storage units and/or devices. The multiple different storage units and/or devices may or may not be of the same type or located at the same physical location.

In one or more embodiments, any non-volatile storage (not shown) and/or memory (not shown) of a computing device or system of computing devices may be considered, in whole or in part, as non-transitory computer readable mediums, which may store software and/or firmware.

Such software and/or firmware may include instructions which, when executed by the one or more processors (not shown) or other hardware (e.g., circuitry) of a computing device and/or system of computing devices, cause the one or more processors and/or other hardware components to perform operations in accordance with one or more embodiments described herein.

The software instructions may be in the form of computer readable program code to perform, when executed, methods of embodiments as described herein, and may, as an example, be stored, in whole or in part, temporarily or permanently, on a non-transitory computer readable medium such as a compact disc (CD), digital versatile disc (DVD), storage device, diskette, tape storage, flash storage, physical memory, or any other non-transitory computer readable medium.

In one or more embodiments of the invention, the CV environment (120) includes the functionality to perform one or more CV workloads and provide CV services for users of the system. The CV environment (120) may include the functionality to perform a portion of the methods of FIGS. 3A-3B and FIGS. 5A-5B. The CV environment (120) may include other and/or additional functionalities without departing from the invention.

In one or more embodiments of the invention, the CV environment (120) is implemented as computing devices. For additional information regarding computing devices, refer to the above discussion and/or FIG. 7.

To provide the aforementioned functionality of the CV environment (120), the CV environment (120) may include a CV environment manager (122), a graphics processing unit(s) (GPUs) (124), and CV nodes (126). The CV environment (120) may include other, additional, and/or fewer components without departing from the invention. Each of the aforementioned components of the CV environment (120) is discussed below.

In one or more embodiments of the invention, the CV environment manager (122) includes the functionality to perform CV environment management services for the CV environment (120). The CV environment management services may include provisioning CV workloads to the CV nodes (126) based on GPU partition optimizations and power optimizations obtained from the CV manager (100). The CV environment management services may also include generating, obtaining, and/or maintaining power consumption information, GPU partition information, CV workload information, and CV environment configuration information (all discussed below). To perform the CV environment management services, the CV environment manager (122) may communicate data (e.g., power consumption information, GPU partition information, CV workload information, and CV environment information) between the CV nodes (126), the GPU (124), and/or the CV manager (100). The CV environment management services may include other and/or additional services without departing from the invention.

In one or more embodiments of the invention, the CV environment manager (122) is implemented as one or more computing devices. The computing devices may be computing devices of the CV environment (120). For additional information regarding computing devices, refer to the above discussion and/or FIG. 7.

In one or more embodiments of the invention, the CV environment manager (122) is implemented as a logical device. The logical device may utilize the computing resources of any number of computing devices (e.g., computing devices of the CV environment (120)), and thereby provide the functionality of the CV environment manager (122) described throughout this application.

In one or more embodiments of the invention, the graphics processing unit (GPU) (124) includes the functionality to perform all, or a portion, of CV workloads for one or more CV nodes (126). To perform the CV workloads, the GPU may obtain video data from the CV nodes (126) and perform processing on the video data to generate CV data. The processing may include any type of video data processing without departing from the invention. The processing may include, for example, facial recognition, object detection, object counting, object tracking, etc. The CV data may include processed video data. The processed video data may include object identifiers, facial identifiers, and/or other types of data related to the performance of the video data processing without departing from the invention. The GPU (124) may provide the CV data to the CV nodes (126) for further processing. The GPU (124) may include other and/or additional functionalities without departing from the invention. In one or more embodiments of the invention, the CV environment (120) includes any number of GPUs (124). Each GPU may be associated with one or multiple CV nodes (126).

In one or more embodiments of the invention, the GPU (124) is implemented as a physical device. The physical device may include processing hardware (not shown) and memory (not shown). The processing hardware may include, but is not limited to, a field-programmable gate array, application specific integrated circuit, programmable processor, microcontroller, digital signal processor, a host bus adapter (HBA) card, other processing hardware, or any combination thereof. The memory may include video data and CV data generated during the performance of CV workload by the GPU. The memory may be, for example, Random Access Memory (RAM) or any other type of volatile storage without departing from the invention. The GPU (124) may also include and/or otherwise have access to persistent storage that may include computer readable instructions, which may executed by the GPU (124) to perform the CV workloads. The GPU (124) may be otherwise adapted to provide the functionality of the GPU (124) described throughout this application. The GPU (124) may include any type of GPU without departing from the invention.

In one or more embodiments of the invention, the GPU (124) includes partitions. The GPU (124) may include any quantity of partitions without departing from the invention. The GPU (124) may include partition A (124A) and partition N (124N). Each partition (e.g., 124A, 124N) may be allocated to a CV node (e.g., 126A) to perform all, or a portion of a CV workload. Each partition (e.g., 124A, 124N) may be allocated to a CV node (e.g., 126A). Each CV node (e.g., 124A) may be allocated any combination of partitions without departing from the inventions.

In one or more embodiments of the invention, the partitions (e.g., 124A, 124N) are implemented as (i.e., GPU instances) individual or combinations of slices of the processing hardware and/or memory of the GPU (124). The slices may be physical and/or logical slices of the processing hardware and/or memory of the GPU (124). The slices may be generated using any appropriate method of GPU slicing without departing from the invention.

In one or more embodiments of the invention, the CV nodes (126) include the functionality to perform CV workloads. The CV workloads may include any type of CV workload without departing from the invention. The CV workloads may include, for example, facial recognition, object detection, object counting, object tracking, inferencing, etc. The CV nodes (126) may provide video data to one or more GPU partitions to generate CV data during the performance of CV workloads. The CV nodes may obtain CV workloads to perform from a user (e.g., system administrator), the CV environment manager (122), and/or other entities (e.g., CV workload vendors, etc.) without departing from the invention. The CV nodes (126) may include any quantity of CV nodes (126) without departing from the invention. For example, the CV nodes (126) may include CV node A (126A) and CV node N (126N). Each CV node of the CV nodes (126) may perform similar or different CV workloads without departing from the invention. The CV nodes (126) may include other and/or additional functionalities without departing from the invention.

In one or more embodiments of the invention, the CV nodes (126) are implemented as one or more computing devices. The computing devices may be computing devices of the CV environment (120). For additional information regarding computing devices, refer to the above discussion and/or FIG. 7.

In one or more embodiments of the invention, the CV nodes (126) are implemented as logical devices. The logical device may utilize the computing resources of any number of computing devices (e.g., computing devices of the CV environment (120)), and thereby provide the functionality of the CV nodes (126) described throughout this application.

In one or more embodiments of the invention, the CV nodes (126) include and/or are operatively connected to one or more cameras or a video management system (VMS). The cameras and/or VMS may capture and/or record video data. The cameras and/or VMS may include any appropriate type of device (e.g., pan-tilt-zoom cameras, webcams, camcorders, smartphones, etc.) for capturing, recording, broadcasting, and/or streaming video data without departing from the invention. The cameras and/or VMS may provide (e.g., stream, broadcast, transmit, etc.) the video data to the CV nodes (126) to perform CV workloads using the video data. The video data may include any appropriate type of video data and/or video data format without departing from the invention.

While FIG. 1 shows a configuration of components, other configurations may be used without departing from the scope of embodiments described herein. Accordingly, embodiments disclosed herein should not be limited to the configuration of components shown in FIG. 1.

Figure 2:
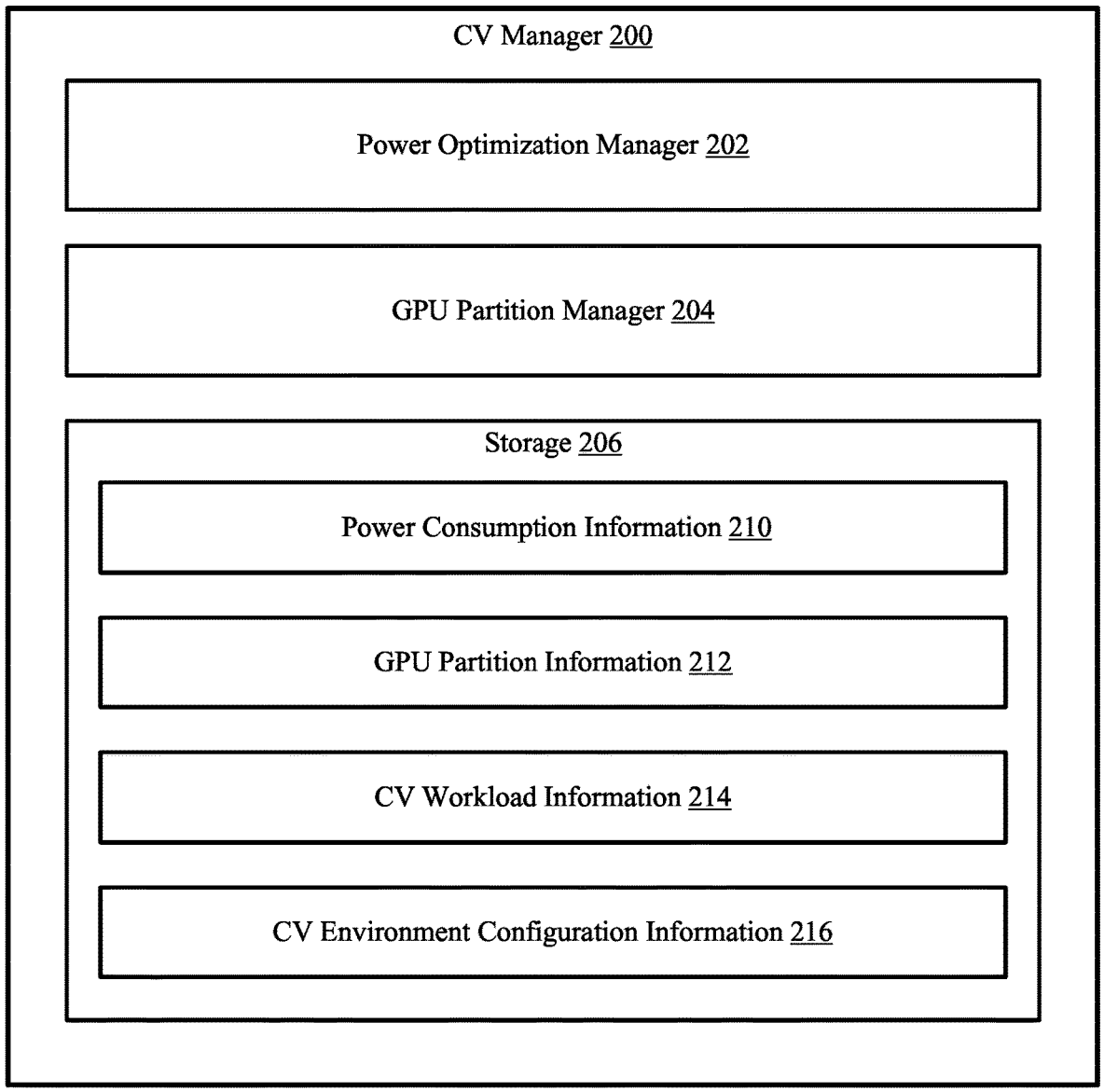
FIG. 2 shows a diagram of a CV manager in accordance with one or more embodiments of the invention.

FIG. 2 shows a diagram of a CV manager in accordance with one or more embodiments of the invention. The CV manager (200) may be an embodiment of the CV manager (100, FIG. 1) discussed above. As discussed above, the CV manager (200) includes the functionality to perform power optimization services and GPU partitioning services. To perform the aforementioned power optimization services and the GPU partitioning services, the CV manager (200) may include a power optimization manager (202), a GPU partition manager (204), and storage (206). The CV manager (200) may include other, additional, and/or fewer component without departing from the invention. Each of the aforementioned components of the CV manager (200) is discussed below.

In one or more embodiments of the invention, the power optimization manager (202) includes the functionality to perform the power optimization services of the CV manager (200). The power optimization services may include generating initial power optimization reports associated with CV workloads. The power optimization services may further include generating real-time power optimization reports. Additionally, the power optimization services may include provisioning CV workloads based on the initial power optimization reports and reconfiguring CV workloads based on the real-time power optimization reports. The power optimization services may include other and/or additional services without departing from the invention. The power optimization manager (202) may include other and/or additional functionalities without departing from the invention. For additional information regarding the performance of power optimization services, refer to FIGS. 3A-3B.

In one or more embodiments of the invention, the power optimization manager (202) is implemented as a physical device. The physical device may include circuitry. The physical device may be, for example, a field-programmable gate array, application specific integrated circuit, programmable processor, microcontroller, digital signal processor, or other hardware processor. The physical device may be adapted to provide the functionality of the power optimization manager (202) described throughout this application.

In one or more embodiments of the invention, the power optimization manager (202) is implemented as computer instructions, e.g., computer code, stored on a persistent storage that when executed by a processor of the CV manager (200) causes the CV manager (200) to provide the functionality of the power optimization manager (202) described throughout this application.

In one or more embodiments of the invention, the GPU partition manager (204) includes the functionality to perform the GPU partition services of the CV manager (200). The GPU partition services may include generating initial optimal GPU partition allocations associated with CV workloads. The GPU partition services may further include generating real-time optimal GPU partition allocations. Additionally, the GPU partition services may include provisioning CV workloads based on the initial optimal GPU partition allocation and reconfiguring the GPU based on the real-time optimal GPU partition allocations. The GPU partition services may include other and/or additional services without departing from the invention. The GPU partition manager (204) may include other and/or additional functionalities without departing from the invention. For additional information regarding the performance of GPU partition services, refer to FIGS. 5A-5B.

In one or more embodiments of the invention, the GPU partition manager (204) is implemented as a physical device. The physical device may include circuitry. The physical device may be, for example, a field-programmable gate array, application specific integrated circuit, programmable processor, microcontroller, digital signal processor, or other hardware processor. The physical device may be adapted to provide the functionality of the GPU partition manager (204) described throughout this application.

In one or more embodiments of the invention, the GPU partition manager (204) is implemented as computer instructions, e.g., computer code, stored on a persistent storage that when executed by a processor of the CV manager (200) causes the CV manager (200) to provide the functionality of the GPU partition manager (204) described throughout this application.

In one or more embodiments of the invention, the storage (206) is implemented using one or more physical devices that provide data storage services (e.g., storing data and providing copies of previously stored data). The devices that provide data storage services may include hardware devices and/or logical devices. For example, storage (206) may include any quantity and/or combination of memory devices (i.e., volatile storage), long term storage devices (i.e., persistent storage), other types of hardware devices that may provide short term and/or long term data storage services, and/or logical storage devices (e.g., virtual persistent storage/virtual volatile storage).

For example, storage (206) may include a memory device (e.g., a dual in line memory device) in which data is stored and from which copies of previously stored data are provided. In another example, storage (206) may include a persistent storage device (e.g., a solid-state disk drive) in which data is stored and from which copies of previously stored data is provided. In a still further example, storage (206) may include (i) a memory device (e.g., a dual in line memory device) in which data is stored and from which copies of previously stored data are provided and (ii) a persistent storage device that stores a copy of the data stored in the memory device (e.g., to provide a copy of the data in the event that power loss or other issues with the memory device that may impact its ability to maintain the copy of the data cause the memory device to lose the data).

The storage (206) may also be implemented using logical storage. A logical storage (e.g., virtual disk) may be implemented using one or more physical storage devices whose storage resources (all, or a portion) are allocated for use using a software layer. Thus, a logical storage may include both physical storage devices and an entity executing on a processor or other hardware device that allocates the storage resources of the physical storage devices.

The storage (206) may store data structures including, for example, power consumption information (210), GPU partition information (212), CV workload information (214), and CV environment configuration information (216). The storage may store other, additional, and/or fewer data structures without departing from the invention. Each of the aforementioned data structures is discussed below.

The power consumption information (210) may be one or more data structures that include the power consumption (i.e., in watts) associated with the CV nodes, equipment racks, power distribution units, power zones, circuits, data centers, etc. of the CV environment. For each CV node, the power consumption may specify the portion of the power consumption associated with each CV workload executed by the CV node. The power consumption information (210) may also include power consumption thresholds associated with the CV nodes. The power consumption thresholds may be values of power consumption, over which a CV workload execution on the CV node associated with the power consumption threshold must be realigned to avoid power failure of the CV node. The power consumption information (210) may include other and/or additional information associated with the power consumption of the CV nodes of the CV environment. The power consumption information (210) may be generated by the CV environment manager and/or CV nodes during the performance of CV workloads. The power consumption information (210) may be updated in the storage (206) periodically, in response to requests, and/or in real-time. The power consumption information (210) may be used by the power optimization manager (202) to generate real-time power optimization reports.

The GPU partition information (212) may be one or more data structures that include information regarding the GPU partitions without departing from the invention. The GPU partition information (212) may include the current GPU partition allocation that specifies to which CV node each GPU partition is allocated to. The GPU partition information (212) may also include GPU partition performance information. The GPU partition performance information may include, for example, GPU partition operations per second, GPU partition utilization, GPU partition temperature, and/or other or additional information regarding the performance of the GPU partitions. The GPU partition information may also include the type of GPU associated with the GPU. The GPU partition information (212) may include other and/or additional information without departing from the invention. The GPU partition information (212) may be generated by the CV environment manager during the provisioning and real-locating of GPU partitions to perform CV workloads. The GPU partition information (212) may be updated in the storage (206) periodically, in response to requests, and/or in real-time. The GPU partition information (212) may be used by the GPU partition manager (204) to generate real-time optimal GPU partition allocations.

The CV workload information (214) may be one or more data structures that include information associated with CV workloads performed by CV nodes in the CV environment. The CV workload information (214) may include, for example, video data complexity (i.e., framerate, video resolution, physical environment captured, etc.), CV workload type, CV workload vender, etc. The CV workload information (214) may also specify the CV node which performs each CV workload. The CV workload information (214) may include other and/or additional information associated with CV workloads without departing from the invention. The CV workload information (214) may be generated by the CV environment manager, a user, and/or a CV workload vender when a CV workload is provisioned and/or when components associated with the CV workload change (e.g., a camera). The CV workload information (214) may be updated in the storage (206) periodically, in response to requests, and/or in real-time. The CV workload information (214) may be used to perform power optimization services and GPU partitioning services.

The CV environment configuration information (216) may be one or more data structures that include information associated with the CV nodes of the CV environment. The CV environment configuration information may include CPU types, GPU types, GPU partition schemes, current GPU partition allocations, CPU utilization, memory type, memory capacity and utilization, number of CPU cores, etc. associated with the CV nodes of the CV environment. The CV environment configuration information (216) may include other and/or additional information associated with CV nodes of the CV environment without departing from the invention. The CV environment configuration information (216) may be generated by a user or the CV environment configuration information and may be updated as CV nodes and the components of CV nodes change. The CV environment configuration information (216) updated in the storage (206) periodically, in response to requests, and/or in real-time. The CV environment configuration information (216) may be used to perform GPU partition services and power optimization services.

The data structures discussed throughout this application may be implemented using, for example, lists, tables, unstructured data, databases, etc. While illustrated in FIG. 2 as being stored locally, the data structures (210, 212, 214, 216) may be stored remotely and may be distributed across any number of devices without departing from the invention.

Figure 3A:
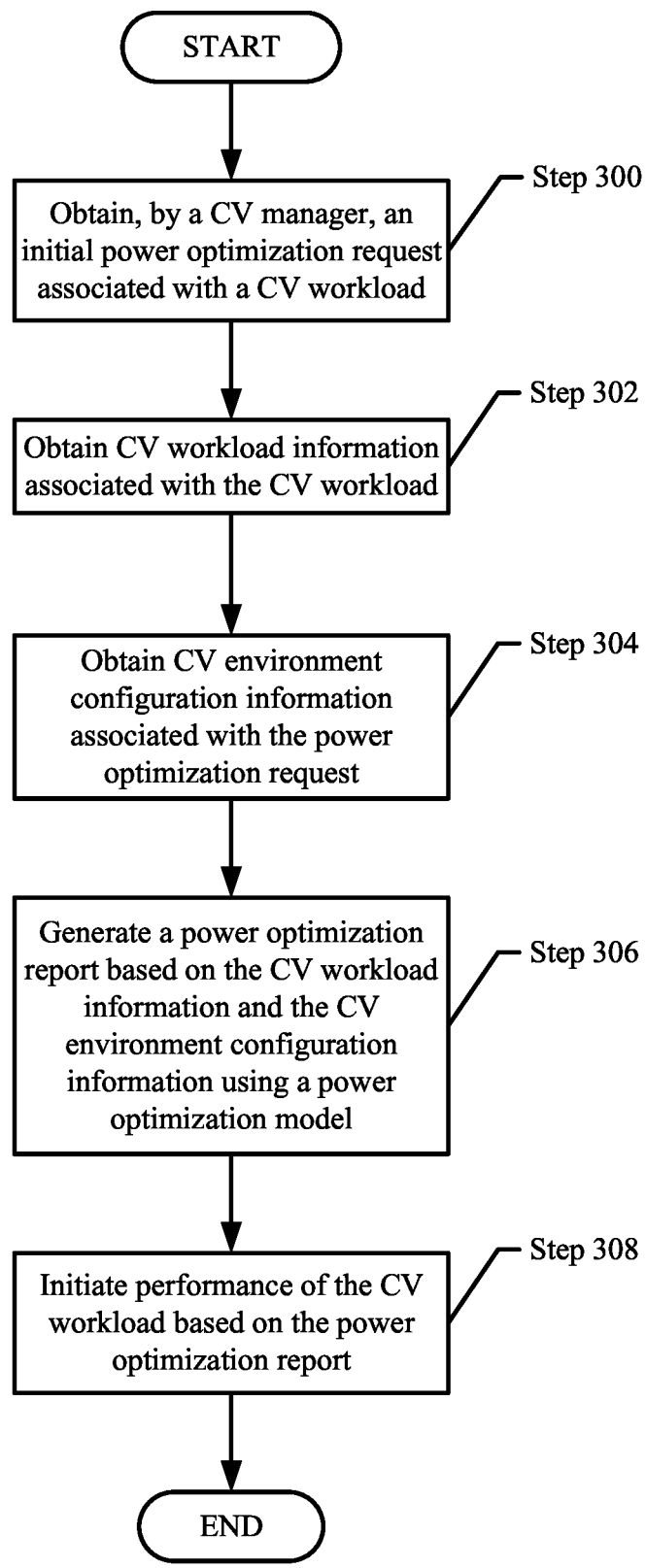
FIG. 3A shows a flowchart of a method for provisioning a CV workload based on an initial power optimization report in accordance with one or more embodiments of the invention.
Figure 3B:
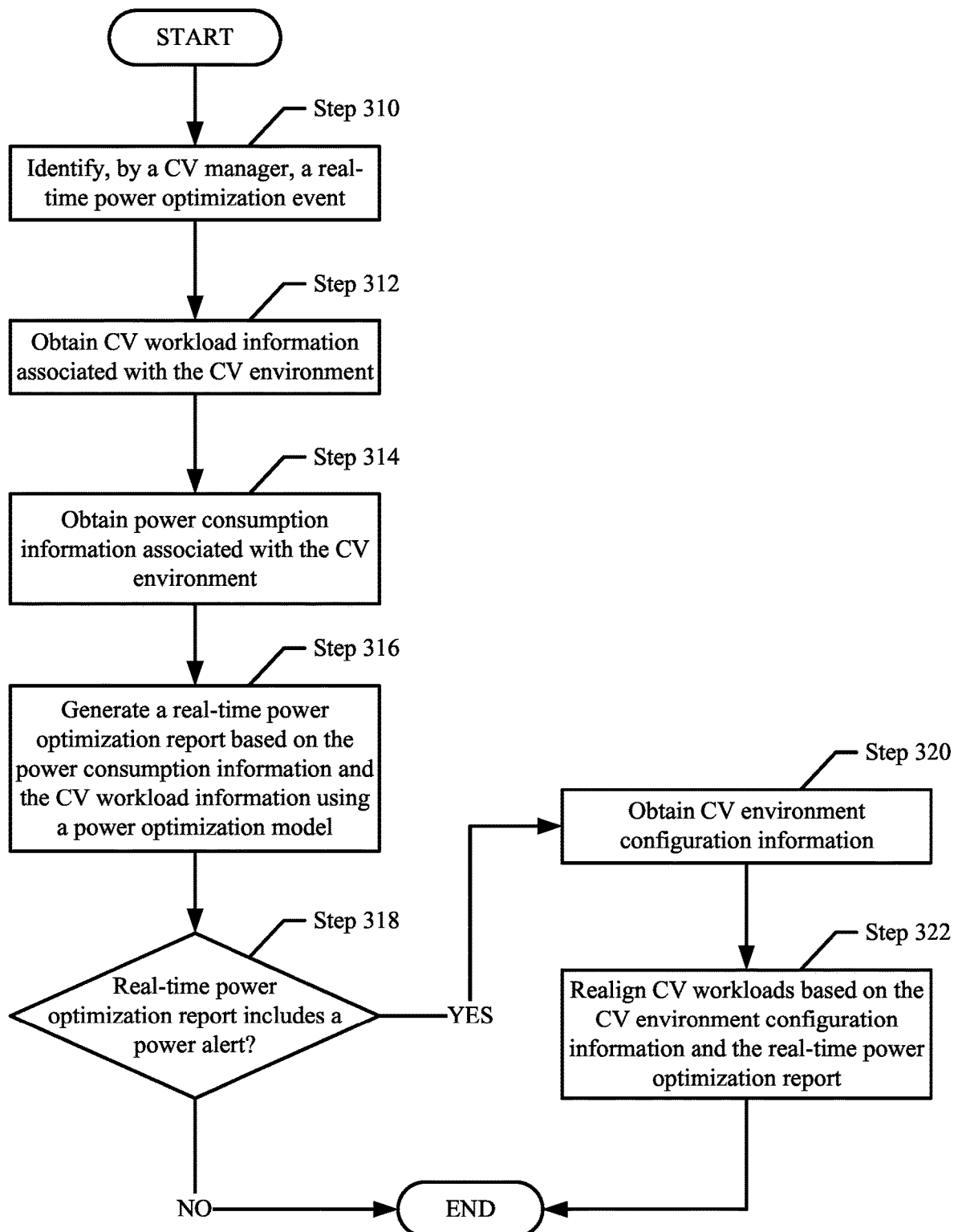
FIG. 3B shows a flowchart of a method reconfiguring CV workloads based on a real-time power optimization report in accordance with one or more embodiments of the invention.

As discussed above, the system of FIG. 1 may perform CV workloads for a CV environment using CV nodes. FIGS. 3A-3B show methods that may be performed by components of the system of FIG. 1 to optimize the power consumption of the CV environment during the performance of CV workloads.

Turning to FIG. 3A, FIG. 3A shows a flowchart of a method in accordance with one or more embodiments of the invention. The method depicted in FIG. 3A may be performed to provision a CV workload based on an initial power optimization report. The method shown in FIG. 3A may be performed by, for example, a power optimization manager (e.g., 202, FIG. 2) of a CV manager (100, FIG. 1). Other components of the system in FIG. 1 may perform all, or a portion, of the method of FIG. 3A without departing from the invention.

While FIG. 3A is illustrated as a series of steps, any of the steps may be omitted, performed in a different order, additional steps may be included, and/or any or all of the steps may be performed in a parallel and/or partially overlapping manner without departing from the invention.

In Step 300, a CV manager obtains an initial power optimization request associated with a CV workload. In one or more embodiments of the invention, the power optimization manager of the CV manager obtains a message. The message may include a request to provision a CV workload based on an initial power optimization report. The message may include a CV workload identifier associated with the CV workload. The message may include other and/or additional information without departing from the invention. The message may be obtained from a user (e.g., a system administrator), or other and/or additional components illustrated in the system of FIG. 1 without departing from the invention.

The message may be provided to the power optimization manager of the CV manager using any appropriate method of data transmission without departing from the invention. As an example, the message may be transmitted as data packets through one or more network devices that operatively connect the CV manager to the user. The initial power optimization request associated with the CV workload may be obtained by the CV manager via other and/or additional methods without departing from the invention.

In Step 302, CV workload information associated with the CV workload is obtained. As discussed above, the power optimization manager of the CV manager may obtain a message that includes the initial power optimization request associated with the CV workload. The message may further include CV workload information associated with the CV workload. The power optimization manager may obtain the CV workload information associated with the CV workload by parsing the message and identifying the CV workload information.

In other embodiments of the invention, the message obtained in step 300 may include a CV workload identifier (i.e., a unique combination of bits and/or characters associated with a particular CV workload) associated with the CV workload information. The power optimization manager may use the CV workload identifier included in the message to identify CV workload information associated with the CV workload included in the CV workload information (e.g., 214, FIG. 2) of the storage (e.g., 206, FIG. 2) of the CV manager. The power optimization manager may obtain all CV workload information associated with the CV workload identifier included in the storage of the CV manager using the CV workload identifier. CV workload information associated with the CV workload may be obtained via other and/or additional methods without departing from the invention.

In Step 304, CV environment configuration information associated with the power optimization request is obtained. In one or more embodiments of the invention, the power optimization manager of the CV manager sends a request for CV environment configuration information to the CV environment manager of the CV environment. In response to obtaining the request, the CV environment manager may generate and/or obtain CV environment configuration information associated with the CV environment. After generating and/or obtaining the CV environment configuration information, the CV environment manager may provide the CV environment configuration information to the power optimization manager of the CV manager. The request and the CV environment configuration information may be transmitted between the power optimization manager of the CV manager and the CV environment manager using any appropriate method of data transmission without departing from the invention. As an example, the request and the CV environment configuration information may be transmitted as data packets through one or more network devices that operatively connect the power optimization manager of the CV manager to the CV environment manager.

In other embodiments of the invention, the CV environment manager may periodically, or in real-time, provide updated CV environment configuration to the CV manager. The CV manager may store the updated CV environment configuration information (e.g., 216, FIG. 2) in the storage of the CV manager. The power optimization manager may obtain the most recently updated CV environment configuration information included in the storage. CV environment configuration information associated with the power optimization request may be obtained via other and/or additional methods without departing from the invention.

In Step 306, a power optimization report is generated based on the CV workload information and the CV environment configuration information using a power optimization model. The power optimization manager may input the CV workload information and the CV environment configuration information into the power optimization model to generate the power optimization report. The power optimization report may include one or more data structures that include the predicted power consumption required to execute the CV workload in the CV environment. The predicted power consumption may be associated with any appropriate unit for electrical power (e.g., watts). The power prediction model may include any appropriate prediction model for predicting power consumption of CV workloads based on CV workload information and CV environment configuration information without departing from the invention. The prediction model may include, for example, any machine learning model, any artificial intelligence model, or any combination thereof (e.g., random forest model, K-Nearest Neighbors model, linear regression model, neural network, etc.). The power optimization report may be generated based on the CV workload information and the CV environment configuration information using a power optimization model using other and/or additional methods without departing from the invention.

In Step 308, the performance of the CV workload is initiated based on the power optimization report. As discussed above, the power optimization report may specify the predicted power consumption of executing the CV workload in the CV environment. The power optimization manager may identify one or more CV nodes of the CV environment capable of performing the CV workload and with the power capabilities to satisfy the predicted power consumption of the CV workload. The power optimization manager may then request the CV environment manager to instantiate the CV workload on the identified CV node(s). In response to obtaining the request, the CV environment manager may instantiate the CV workload on the CV node(s). As a result, the CV workload may be executed on a CV node(s) that includes the power capability to satisfy the predicted power consumption associated with the CV workload. The performance of the CV workload may be initiated based on the power optimization report via other and/or additional methods without departing from the invention.

In one or more embodiments of the invention, the method ends following Step 308.

Turning to FIG. 3B, FIG. 3B shows a flowchart of a method in accordance with one or more embodiments of the invention. The method depicted in FIG. 3B may be performed to reconfigure CV workloads based on a real-time power optimization report. The method shown in FIG. 3B may be performed by, for example, a power optimization manager (e.g., 202, FIG. 2) of a CV manager (100, FIG. 1). Other components of the system in FIG. 1 may perform all, or a portion, of the method of FIG. 3B without departing from the invention.

While FIG. 3B is illustrated as a series of steps, any of the steps may be omitted, performed in a different order, additional steps may be included, and/or any or all of the steps may be performed in a parallel and/or partially overlapping manner without departing from the invention.

In Step 310, a real-time power optimization event is identified by the CV manager. In one or more embodiments of the invention, the power optimization manager includes or otherwise has access to a power optimization schedule. The power optimization schedule may be a data structure that specifies points in time in which the power optimization manager is to generate real-time power optimization reports associated with the CV workloads executing the CV environment. The power optimization schedule may specify, for example, that real-time power optimization reports are to be generated every five minutes. The power optimization manager may monitor the power optimization schedule and identify the occurrence of points in time specified by the power optimization schedule to generate real-time power optimization reports. The power optimization manager may identify the occurrence of a point in time specified by the power optimization schedule as the real-time power optimization event.

In other embodiments of the invention, the CV environment manager may monitor the power consumption of the CV nodes and/or any other components associated with the CV nodes (e.g., circuits, power distribution units, etc.) of the CV environment. The CV environment manager may also include or otherwise have access to CV node power consumption thresholds associated with the CV nodes. The CV node manager may compare the power consumption of the CV nodes with the power consumption thresholds associated with the CV nodes. If the power consumption of a CV node exceeds the power consumption threshold associated with the CV node, the CV environment manager may send a notification to the power optimization manager of the CV manager. The power optimization manager may identify obtaining the notification from the CV environment manager specifying that a power consumption threshold is exceeded as the real-time power optimization event. The real-time power optimization event may be identified by the CV manager via other and/or additional methods without departing from the invention.

In Step 312, CV workload information associated with the CV environment is obtained. In one or more embodiments of the invention, the CV workload information (e.g., 214, FIG. 2) of the storage (e.g., 206, FIG. 2) of the CV manager may include a list of CV workloads currently executing in the CV environment. The list of CV workloads currently executing in the CV environment may be updated by the CV environment manager as CV workloads are provides and realigned. The power optimization manager may obtain all CV workload information associated with the CV workloads included in the list of current CV workloads. CV workload information associated with the CV environment may be obtained via other and/or additional methods without departing from the invention.

In Step 314, power configuration information associated with the CV environment is obtained. As discussed above, the CV environment manager may monitor the power consumption information associated with each CV node. The power optimization manager may send a request to the CV environment manager for the power consumption information of the CV environment. In response to obtaining the request, the CV environment manager may obtain and/or generate the power consumption information associated with the CV nodes of the CV environment. The CV environment manager may then provide the power configuration information associated with the CV nodes of the CV environment to the power optimization manager. The request and the power consumption information may be transmitted between the power optimization manager of the CV manager and the CV environment manager using any appropriate method of data transmission without departing from the invention. As an example, the request and the power configuration information may be transmitted as data packets through one or more network devices that operatively connect the power optimization manager of the CV manager to the CV environment manager. The power consumption information associated with the CV environment may be obtained via other and/or additional methods without departing from the invention.

In Step 316, a real-time power optimization report is generated based on the CV workload information and the power configuration information using a power optimization model. The power optimization manager may input the CV workload information and the power consumption information into the power optimization model to generate the real-time power optimization report. The real-time power optimization report may be one or more data structures that include the predicted power consumption required to execute the CV workloads in the CV environment. The predicted power consumption may be associated with any appropriate unit for electrical power (e.g., watts). The power prediction model may be an embodiment of the power prediction model discussed above.

In Step 318, a determination is made as to whether the real-time power optimization report includes a power alert. As discussed above, the real-time power optimization report may specify the predicted power consumption associated with the CV workloads executing on the CV nodes. A power alert may be included in the real-time power optimization report if the predicted power consumption associated with a CV node or any other components associated with the CV node (e.g., circuits, power distribution units, etc.) exceeds a power consumption threshold associated with the CV node. The power optimization manager may compare the predicted power consumption of the CV workloads executing on each CV node with the power consumption threshold associated with each CV node. In one or more embodiments of the invention, if the total predicted power consumption associated with one or more CV nodes exceeds the power consumption threshold associated with the CV node, then the power optimization manager determines that the real-time power optimization report includes a power alert. In one or more embodiments of the invention, if the total predicted power consumption associated with all CV nodes does not exceed the power consumption threshold associated with the CV nodes, then the power optimization manager determines that the real-time power optimization report does not include a power alert. The determination as to whether the real-time power optimization report includes a power alert may be made via other and/or additional methods without departing from the invention.

In one or more embodiments of the invention, if it is determined that the real-time power optimization report includes a power alert, then the method proceeds to Step 320. In one or more embodiments of the invention, if it is determined that the real-time power optimization report does not include a power alert, then the method ends following Step 318.

In Step 320, CV environment configuration information is obtained. In one or more embodiments of the invention, the power optimization manager of the CV manager sends a request for CV environment configuration information to the CV environment manager of the CV environment. In response to obtaining the request, the CV environment manager may generate and/or obtain CV environment configuration information associated with the CV environment. After generating and/or obtaining the CV environment configuration information, the CV environment manager may provide the CV environment configuration information to the power optimization manager of the CV manager. The request and the CV environment configuration information may be transmitted between the power optimization manager of the CV manager and the CV environment manager using any appropriate method of data transmission without departing from the invention. As an example, the request and the CV environment configuration information may be transmitted as data packets through one or more network devices that operatively connect the power optimization manager of the CV manager to the CV environment manager.

In other embodiments of the invention, the CV environment manager may periodically, or in real-time, provide updated CV environment configuration information to the CV manager. The CV manager may store the updated CV environment configuration information (e.g., 216, FIG. 2) in the storage of the CV manager. The power optimization manager may obtain the most recently updated CV environment configuration information included in the storage. CV environment configuration information associated with the CV environment may be obtained via other and/or additional methods without departing from the invention.

In Step 322, the CV workloads are realigned based on the CV environment configuration information and the real-time power optimization report. As discussed above, the real-time power consumption report may power alerts associated with CV nodes. For each power alert, the power optimization manager may realign or initiate the realignment (i.e., by the CV environment manager) one or more CV workloads executing on the CV node(s) associated with the power alert to another CV node(s) of the CV environment capable of performing the CV workload and with the power capabilities to satisfy the predicted power consumption of the CV workload. The power optimization manager may request the CV environment manager to identify one or more CV nodes to realign the one or more CV workloads using the environment configuration information and the real-time power optimization report. In response to obtaining the request, the CV environment manager may identify one or more CV nodes capable of performing the CV workload and instantiate the CV workload on the identified one or more CV nodes. As a result, the one or more CV workloads may be executed on a new CV node(s) that includes the power capability to satisfy the predicted power consumption associated with the CV workload to avoid power failure of the original CV node. The CV workloads may be realigned based on the CV environment configuration information and the real-time power optimization report via other and/or additional methods without departing from the invention.

In one or more embodiments of the invention, the method ends following Step 322.

First Example

The following section describes first examples in accordance with one or more embodiments described herein. The following examples are for explanatory purposes only and not intended to limit the scope of embodiments described herein. Additionally, while the examples show certain aspects of embodiments described herein, all possible aspects of such embodiments may not be illustrated in these particular examples. These example are intended to be simple examples to illustrate, at least in part, concepts described herein.

Figure 4A:
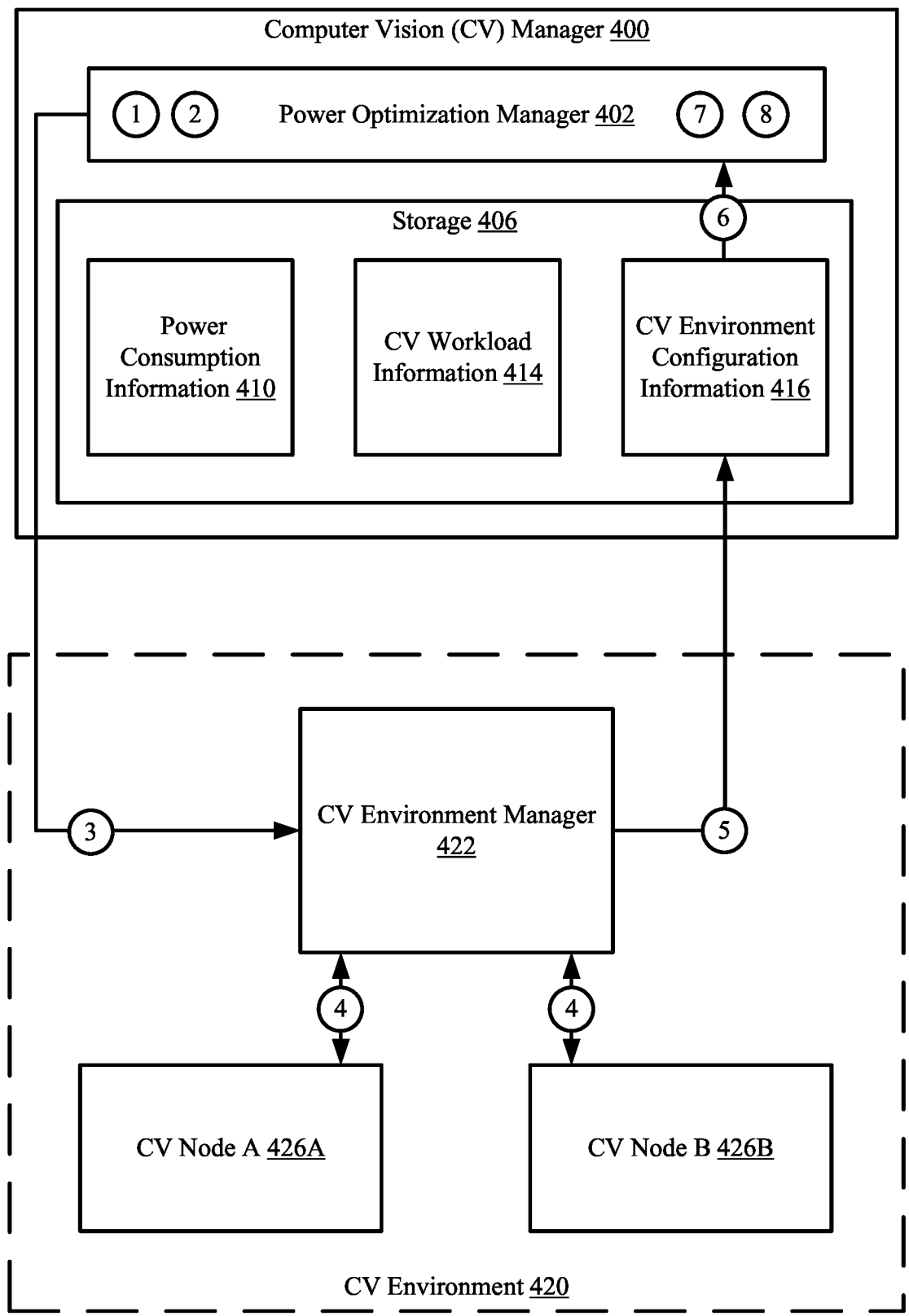
FIGS. 4A-4B show diagrams of a first example in accordance with one or more embodiments of the invention.
Figure 4B:
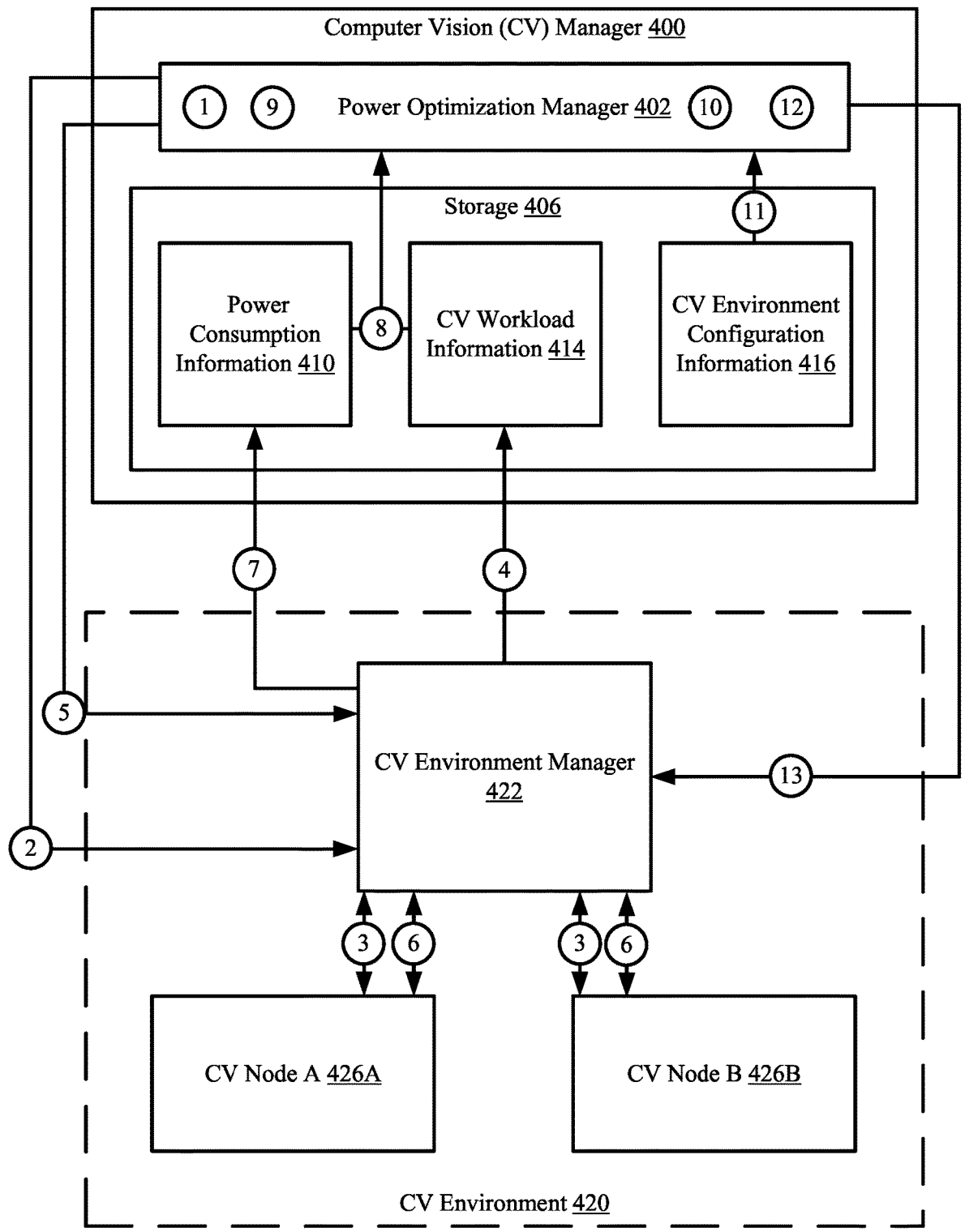

FIGS. 4A-4B show diagrams of a first example in accordance with one or more embodiments of the invention. Turning to FIG. 4A, consider a scenario in which a computer vision (CV) manager (400) performs power optimization services for a CV environment (420). The CV manager (400) includes a power optimization manager (402) and storage (406). The storage (406) includes power consumption information (410), CV workload information (414), and CV environment configuration information (416). The CV environment (420) includes a CV environment manager (422), CV node A (426A), and CV node B (426B).

At Step 1, the power optimization manager (402) obtains a request to provision a CV workload based on an initial power optimization report. The CV workload is an object detection CV workload for detecting abandoned bags. The request to perform the CV workload includes CV workload information associated with the CV workload. The CV workload information specifies that the CV workload is an object detection CV workload. The CV workload information further specifies a video data complexity associated with the CV workload. At Step 2, the power optimization manager (402) parses the request to obtain the CV workload information associated with the CV workload. At Step 3, the power optimization manager (402) sends a request to the CV environment manager (422) of CV environment configuration information.

In response to obtaining the request, at Step 4, the CV environment manager (422) obtains CV environment configuration information associated with CV node A (426A) and CV node B (426B). The CV node configuration information includes the CPU type, CPU core count, CPU utilization, memory type, and memory utilization associated with both CV node A (426A) and CV node B (426B). After obtaining the CV environment configuration information, at Step 5, the CV environment manager (422) updates the CV environment configuration information (416) in the storage (406) with the CV environment configuration information associated with CV node A (426A) and CV node B (426B).

The CV environment manager (422) may notify the power optimization manager (402) that CV environment configuration information associated with CV node A (426A) and CV node B (426B) is included in the CV environment configuration information (416) of the storage (406). At Step 6, the power optimization manager (402) then obtains the CV environment configuration information associated with CV node A (426A) and CV node B (426B) from the storage (406).

At Step 7, the power optimization manager (402) generates a power optimization report. The power optimization manager (402) generates the power optimization report by applying a power optimization model to the CV workload information and the CV environment configuration information. At Step 8, the power optimization manager determines that CV node A (426A) should be provisioned to execute the CV workload based on the power capability of CV node A (426A) and the predicted power consumption of the CV workload. CV node B (426B) includes more current power demand than CV node A (426A), and therefore, would not be optimal to provision the CV workload. Based on the determination, the power optimization manager (402) initiates the performance of the CV workload using CV node A (426A).

Turning to FIG. 4B, consider a scenario in which a period of time has passed since Step 8 of FIG. 4A. At Step 1 of FIG. 4B, the power optimization manager (402) identifies a real-time power optimization event based on a power optimization schedule. In response to identifying the real-time power optimization event, at Step 2, the power optimization manager (402) sends a request to the CV environment manager (422) for CV workload information associated with the CV workloads executing on CV node A (426A) and CV node B (426B).

In response to obtaining the request, at Step 3, the CV environment manager (422) obtains updated CV workload information associated with CV node A (426A) and CV node B (426B). At Step 4, the CV environment manager (422) stores the updated CV workload information in the CV workload information (414) of the storage (406). At Step 5, the power optimization manager (402) sends a request to the CV environment manager (422) for power consumption information (410) associated with the CV workloads executing on CV node A (426A) and CV node B (426B). In response to obtaining the request, at Step 6, the CV environment manager (422) obtains updated power consumption information (410) associated with CV node A (426A) and CV node B (426B).

At Step 7, the CV environment manager (422) stores the updated power consumption information (410) in the power consumption information (410) of the storage (406). At Step 8, after being notified that the power consumption information (410) and the CV workload information (414) of the storage (406) has been updated, the power optimization manager obtains updated power consumption information (410) and CV workload information (414) associated with CV node A (426A) and CV node B (426B).

At Step 9, the power optimization manager (402) generates a real-time power optimization report. The power optimization manager (402) generates the real-time power optimization report by applying a power optimization model to the CV workload information and the power consumption information. The camera associated with CV node A (426A) was upgraded to capture video data with double the framerate. As a result, the video data complexity of the CV workload information associated with the object detection CV workload executing on CV node A (426A) increased. Therefore, the real-time power optimization report specifies that the predicted power consumption associated with the CV workload now exceed the power consumption threshold associated with CV node A (426).

Based on the real-time power optimization report, at Step 10, the power optimization manager (402) determines that the real-time power optimization report includes a power alert associated with the CV workload executing on CV node A (426A). In response to the determination, at Step 11, the power optimization manager (402) obtains CV environment configuration information associated with the CV environment (420). The power optimization manager (402), at Step 12, then determines to realign the CV workload from CV node A (426A) to CV node B (426B). At step 13, based on the determination, power optimization manager (402) sends a request to the CV environment manager (422) to realign the CV workload from CV node A (426A) to CV node B (426B). In response to the request, the CV environment manager (422) then moves the CV workload to CV node B (426B).

End of First Example

Figure 5A:
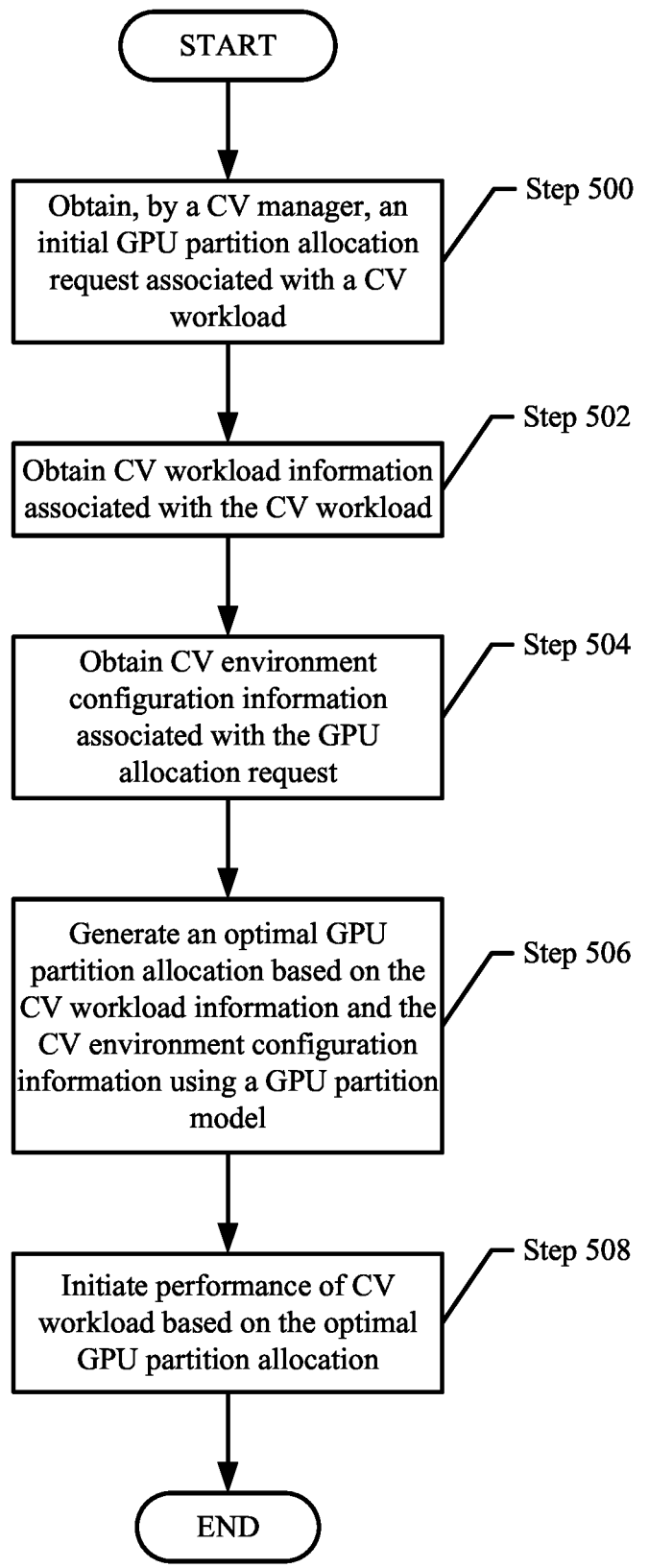
FIG. 5A shows a flowchart of a method for allocating GPU partitions to perform a CV workload based on optimal GPU partition allocations in accordance with one or more embodiments of the invention.
Figure 5B:
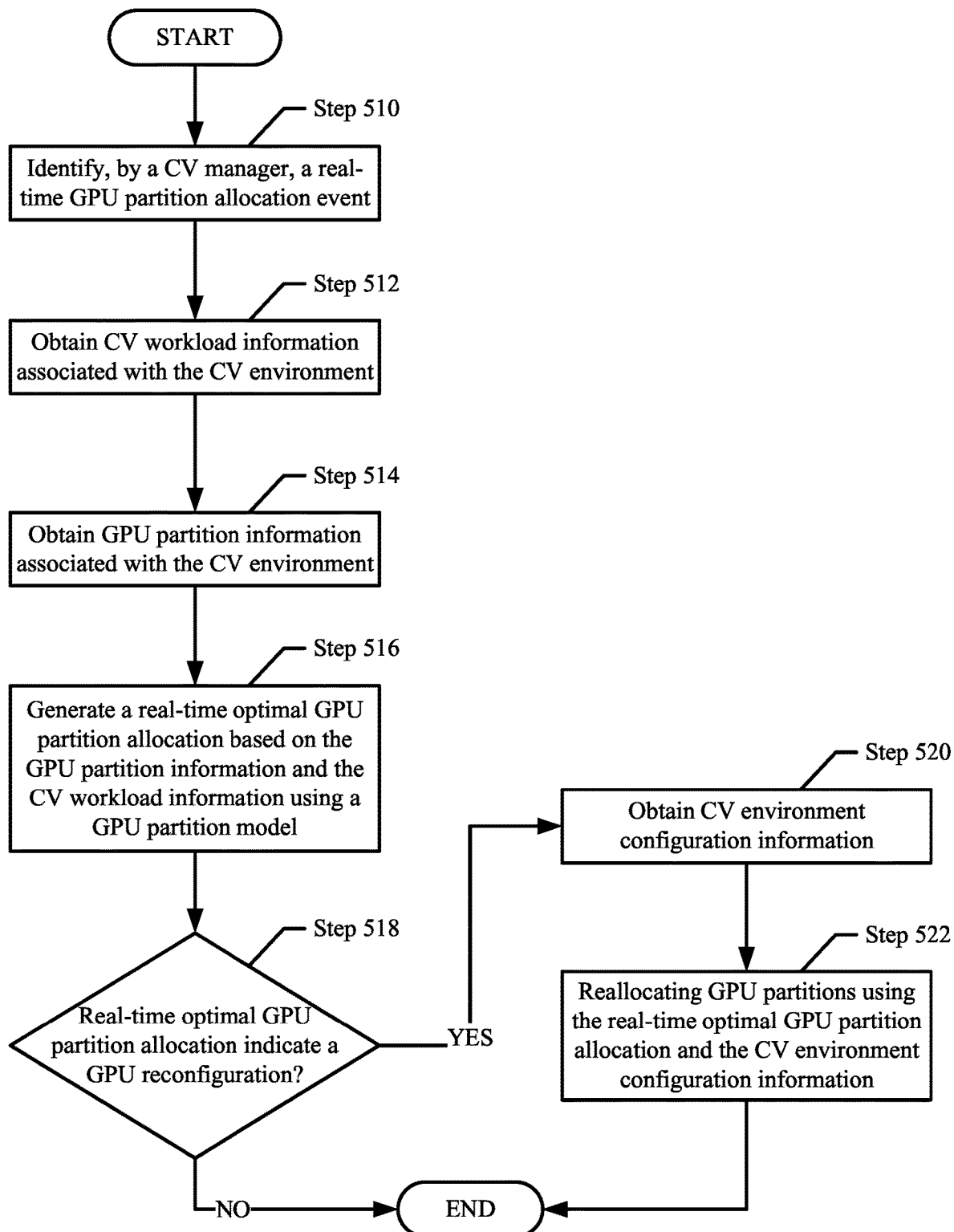
FIG. 5B shows a flowchart of a method for reconfiguring GPU partition allocations based on a real-time optimal GPU partition allocations in accordance with one or more embodiments of the invention.

As discussed above, the system of FIG. 1 may perform CV workloads for a CV environment using CV nodes. FIGS. 5A-5B show methods that may be performed by components of the system of FIG. 1 to allocate GPU partitions to perform the CV workloads.

Turning to FIG. 5A, FIG. 5A shows a flowchart of a method in accordance with one or more embodiments of the invention. The method depicted in FIG. 5A may be performed to allocate GPU partitions to perform a CV workload based on optimal GPU partition allocations. The method shown in FIG. 5A may be performed by, for example, a GPU partition manager (e.g., 204, FIG. 2) of a CV manager (100, FIG. 1). Other components of the system in FIG. 1 may perform all, or a portion, of the method of FIG. 5A without departing from the invention.

While FIG. 5A is illustrated as a series of steps, any of the steps may be omitted, performed in a different order, additional steps may be included, and/or any or all of the steps may be performed in a parallel and/or partially overlapping manner without departing from the invention.

In Step 500, a CV manager obtains an initial GPU partition allocation request associated with a CV workload. In one or more embodiments of the invention, the GPU partition manager of the CV manager obtains a message. The message may include a request to provision a CV workload based on an initial optimal GPU partition allocation. The message may include a CV workload identifier associated with the CV workload. The message may include other and/or additional information without departing from the invention. The message may be obtained from a user (e.g., a system administrator), or other and/or additional components illustrated in the system of FIG. 1 without departing from the invention.

The message may be provided to the GPU partition manager of the CV manager using any appropriate method of data transmission without departing from the invention. As an example, the message may be transmitted as data packets through one or more network devices that operatively connect the CV manager to the user. The initial GPU partition allocation request associated with the CV workload may be obtained by the CV manager via other and/or additional methods without departing from the invention.

In Step 502, CV workload information associated with the CV workload is obtained. As discussed above, the GPU partition manager of the CV manager may obtain a message that includes the initial GPU partition request associated with the CV workload. The message may further include CV workload information associated with the CV workload. The GPU partition manager may obtain the CV workload information associated with the CV workload by parsing the message and identifying the CV workload information.

In other embodiments of the invention, the message obtained in step 300 may include a CV workload identifier (i.e., a unique combination of bits and/or characters associated with a particular CV workload) associated with the CV workload information. The GPU partition manager may use the CV workload identifier included in the message to identify CV workload information associated with the CV workload included in the CV workload information (e.g., 214, FIG. 2) of the storage (e.g., 206, FIG. 2) of the CV manager. The GPU partition manager may obtain all CV workload information associated with the CV workload identifier included in the storage of the CV manager using the CV workload identifier. CV workload information associated with the CV workload may be obtained via other and/or additional methods without departing from the invention.

In Step 504, CV environment configuration information associated with the initial GPU partition allocation request is obtained. In one or more embodiments of the invention, the GPU partition manager of the CV manager sends a request for CV environment configuration information to the CV environment manager of the CV environment. In response to obtaining the request, the CV environment manager may generate and/or obtain CV environment configuration information associated with the CV environment. After generating and/or obtaining the CV environment configuration information, the CV environment manager may provide the CV environment configuration information to the GPU partition manager of the CV manager. The request and the CV environment configuration information may be transmitted between the GPU partition manager of the CV manager and the CV environment manager using any appropriate method of data transmission without departing from the invention. As an example, the request and the CV environment configuration information may be transmitted as data packets through one or more network devices that operatively connect the GPU partition manager of the CV manager to the CV environment manager.

In other embodiments of the invention, the CV environment manager may periodically, or in real-time, provide updated CV environment configuration to the CV manager. The CV manager may store the updated CV environment configuration information (e.g., 216, FIG. 2) in the storage of the CV manager. The GPU partition manager may obtain the most recently updated CV environment configuration information included in the storage. CV environment configuration information associated with the GPU partition allocation request may be obtained via other and/or additional methods without departing from the invention.

In Step 506, an optimal GPU partition allocation is generated based on the CV workload information and the CV environment configuration information using a GPU partition model. The GPU partition manager may input the CV workload information and the CV environment configuration information into the GPU partition model to generate the initial optimal GPU partition allocation. The initial optimal GPU partition allocation may be one or more data structures that specifies an optimal configuration of GPU partitions to allocate to one or more CV workloads executing on one or more CV Nodes (i.e., including the CV workload to be provisioned as requested in Step 500). The GPU partition model may include any appropriate prediction model for predicting optimal GPU partition allocations for executing CV workloads based on CV workload information and CV environment configuration information without departing from the invention. The prediction model may include, for example, any machine learning model, any artificial intelligence model, or any combination thereof (e.g., random forest model, K-Nearest Neighbors model, linear regression model, neural network, etc.). The initial optimal GPU partition allocation may be generated based on the CV workload information and the CV environment configuration information using a GPU partition model via other and/or additional methods without departing from the invention.

In Step 508, the performance of the CV workload is initiated based on the optimal GPU partition allocation. As discussed above, the initial optimal GPU partition allocation may specify the predicted GPU configuration to allocate to the CV workload to execute on one or more CV nodes. The GPU partition manager may identify a CV node of the CV environment capable of performing the CV workload. The GPU partition manager may then request the CV environment manager to instantiate the CV workload on the identified CV node and allocate the optimal GPU partition allocation to the CV node to perform the CV workload. In response to obtaining the request, the CV environment manager may instantiate the CV workload on the CV node and allocate the optimal GPU partition allocation to the CV node. As a result, the CV workload may be executed on a CV node using the optimal GPU partition allocation associated with the CV workload. The performance of the CV workload may be initiated based on the optimal GPU partition allocation via other and/or additional methods without departing from the invention.

In one or more embodiments of the invention, the method ends following Step 508.

Turning to FIG. 5B, FIG. 5B shows a flowchart of a method in accordance with one or more embodiments of the invention. The method depicted in FIG. 5B may be performed to reconfigure GPU partition allocations based on a real-time optimal GPU partition allocations. The method shown in FIG. 5B may be performed by, for example, a GPU partition manager (e.g., 204, FIG. 2) of a CV manager (100, FIG. 1). Other components of the system in FIG. 1 may perform all, or a portion, of the method of FIG. 5B without departing from the invention.

While FIG. 5B is illustrated as a series of steps, any of the steps may be omitted, performed in a different order, additional steps may be included, and/or any or all of the steps may be performed in a parallel and/or partially overlapping manner without departing from the invention.

In Step 510, a real-time GPU partition allocation event is identified by the CV manager. In one or more embodiments of the invention, the GPU partition manager includes or otherwise has access to a GPU partition schedule. The GPU partition schedule may be a data structure that specifies points in time in which the GPU partition manager is to generate real-time optimal GPU partition allocations associated with the CV workloads executing the CV environment. The GPU partition schedule may specify, for example, that optimal GPU partition allocations are to be generated every five minutes. The GPU partition manager may monitor the GPU partition schedule and identify the occurrence of points in time specified by the GPU partition schedule to generate real-time optimal GPU partition allocations. The GPU partition manager may identify the occurrence of a point in time specified by the GPU partition schedule as the real-time GPU partition allocation event.

In other embodiments of the invention, the CV environment manager may monitor the GPU partition information (e.g., GPU partition utilization, latency, operations per second, etc.) associated with the performance of CV workloads by the GPU partitions in the CV environment. The CV environment manager may also include or otherwise have access to GPU partition information thresholds (e.g., utilization thresholds, latency thresholds, operations per second thresholds, etc.) associated with the GPU partitions. The GPU partition manager may compare the GPU partition information associated with the GPU partitions with the GPU partition information thresholds associated with the CV nodes. If the GPU partition information associated with a GPU partition exceeds the GPU partition information threshold associated with the GPU partition, the CV environment manager may send a notification to the GPU partition manager of the CV manager. The GPU partition manager may identify obtaining the notification from the CV environment manager specifying that a GPU partition information threshold is exceeded as the real-time GPU partition allocation event. The real-time GPU partition allocation event may be identified by the CV manager via other and/or additional methods without departing from the invention.

In Step 512, CV workload information associated with the CV environment is obtained. In one or more embodiments of the invention, the CV workload information (e.g., 214, FIG. 2) of the storage (e.g., 206, FIG. 2) of the CV manager may include a list of CV workloads currently executing in the CV environment. The list of CV workloads currently executing in the CV environment may be updated by the CV environment manager as CV workloads are provides and realigned. The GPU partition manager may obtain all CV workload information associated with the CV workloads included in the list of current CV workloads. CV workload information associated with the CV environment may be obtained via other and/or additional methods without departing from the invention.

In Step 514, GPU partition information associated with the CV environment is obtained. As discussed above, the CV environment manager may monitor the GPU partition information associated with each CV node. The GPU partition manager may send a request to the CV environment manager for the GPU partition information of the CV environment. In response to obtaining the request, the CV environment manager may obtain and/or generate the GPU partition information associated with the CV nodes of the CV environment. The CV environment manager may then provide the GPU partition information associated with the CV nodes of the CV environment to the GPU partition manager. The request and the GPU partition information may be transmitted between the GPU partition manager of the CV manager and the CV environment manager using any appropriate method of data transmission without departing from the invention. As an example, the request and the GPU partition information may be transmitted as data packets through one or more network devices that operatively connect the GPU partition manager of the CV manager to the CV environment manager. The GPU partition information associated with the CV environment may be obtained via other and/or additional methods without departing from the invention.

In Step 516, a real-time optimal GPU partition allocation is generated based on the CV workload information and the GPU partition information using a GPU partition model. The GPU partition manager may input the CV workload information and the GPU partition information into the GPU partition model to generate the real-time optimal GPU partition allocation. The real-time GPU partition allocation may be one or more data structures that include the predicted optimal GPU partition allocations for each workload executing on each CV node in the CV environment. The GPU partition model may be an embodiment of the GPU partition model discussed above.

In Step 518, a determination is made as to whether the real-time optimal GPU partition allocation indicates a GPU reconfiguration. As discussed above, the real-time optimal GPU partition allocation specifies an optimal GPU partition allocation for each CV node executing a CV workload. The GPU partition manager may compare the optimal GPU partition allocation with the current GPU partition allocations. In one or more embodiments of the invention, if the optimal GPU partition allocation matches the current GPU partition allocation, then the GPU partition manager determines that the real-time optimal GPU partition allocation does not indicate a GPU reconfiguration. In one or more embodiments of the invention, if the optimal GPU partition allocation does not match the current GPU partition allocation, then the GPU partition manager determines that the real-time optimal GPU partition allocation indicates a GPU reconfiguration. The determination as to whether the real-time GPU partition allocation indicates a GPU reconfiguration may be made via other and/or additional methods without departing from the invention.

In one or more embodiments of the invention, if it is determined that the optimal GPU partition allocation indicates a GPU reconfiguration, then the method proceeds to Step 520. In one or more embodiments of the invention, if it is determined that the optimal GPU partition allocation does not indicate a GPU reconfiguration, then the method ends following Step 518.

In Step 520, CV environment configuration information is obtained. In one or more embodiments of the invention, the GPU partition manager of the CV manager sends a request for CV environment configuration information to the CV environment manager of the CV environment. In response to obtaining the request, the CV environment manager may generate and/or obtain CV environment configuration information associated with the CV environment. After generating and/or obtaining the CV environment configuration information, the CV environment manager may provide the CV environment configuration information to the GPU partition manager of the CV manager. The request and the CV environment configuration information may be transmitted between the GPU partition manager of the CV manager and the CV environment manager using any appropriate method of data transmission without departing from the invention. As an example, the request and the CV environment configuration information may be transmitted as data packets through one or more network devices that operatively connect the GPU partition manager of the CV manager to the CV environment manager.

In other embodiments of the invention, the CV environment manager may periodically, or in real-time, provide updated CV environment configuration information to the CV manager. The CV manager may store the updated CV environment configuration information (e.g., 216, FIG. 2) in the storage of the CV manager. The GPU partition manager may obtain the most recently updated CV environment configuration information included in the storage. CV environment configuration information associated with the CV environment may be obtained via other and/or additional methods without departing from the invention.

In Step 522, the GPU partitions may be reallocated based on the CV environment configuration information and the optimal GPU partition allocation. As discussed above, the real-time optimal GPU partition allocation may specify optimal allocations of GPU partitions associated with CV workloads executing on the CV nodes. The GPU partition manager may reallocate one or more GPU partitions to CV workloads of CV nodes to perform CV workloads based on the real-time optimal GPU partition allocation and CV environment configuration information, which may specify CV nodes capable of performing the CV workloads. The GPU partition manager may then request the CV environment manager to reallocate the one or more GPU partitions to the identified CV nodes. As a result, the one or more CV workloads may be executed on a CV nodes using new GPU partition allocations. The GPU partitions may be reallocated based on the CV environment configuration information and the optimal GPU partition allocation via other and/or additional methods without departing from the invention.

In one or more embodiments of the invention, the method ends following Step 522.

Second Example

The following section describes first examples in accordance with one or more embodiments described herein. The following examples are for explanatory purposes only and not intended to limit the scope of embodiments described herein. Additionally, while the examples show certain aspects of embodiments described herein, all possible aspects of such embodiments may not be illustrated in these particular examples. These example are intended to be simple examples to illustrate, at least in part, concepts described herein.

Figure 6A:
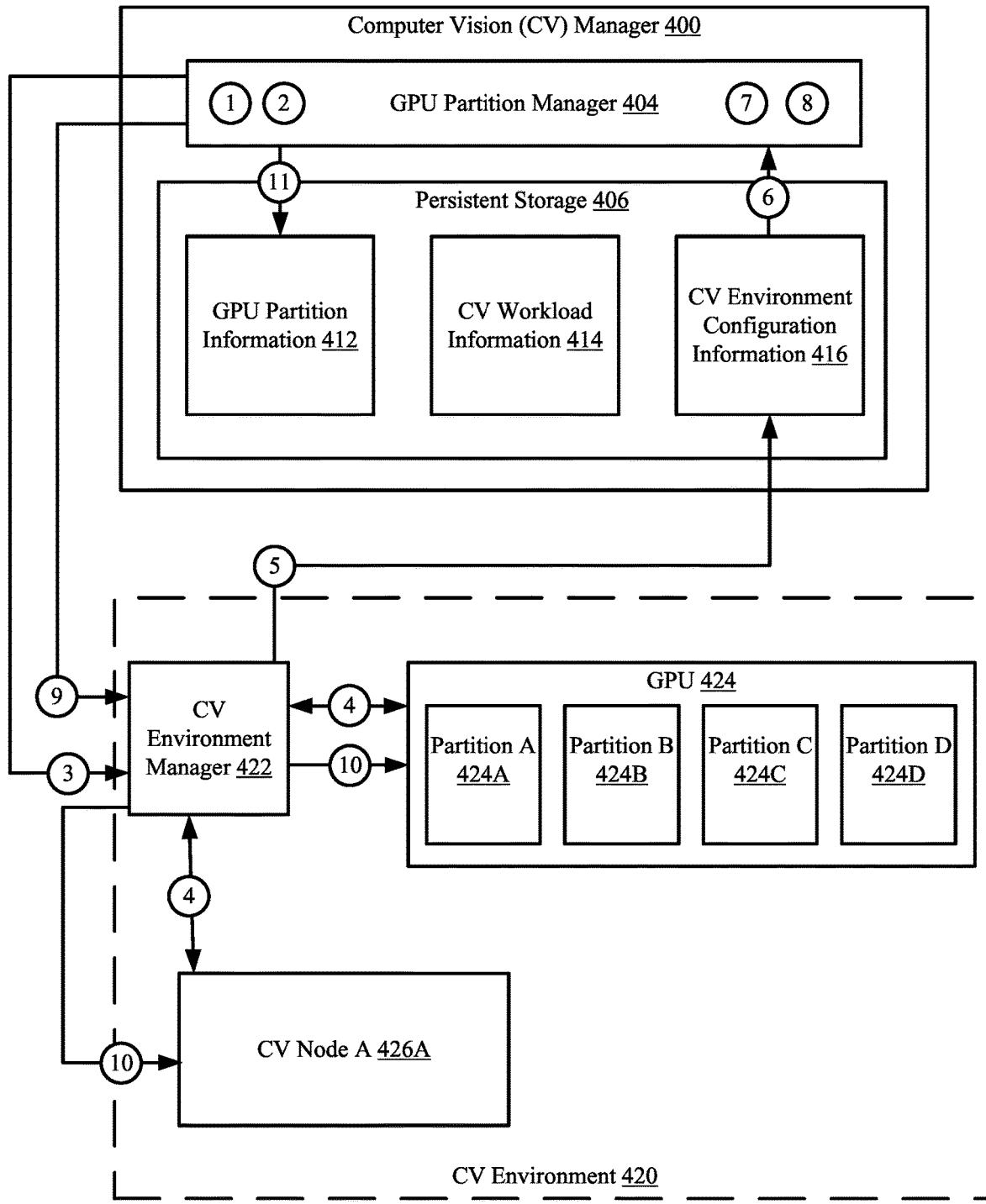
FIGS. 6A-6B show diagrams of a second example in accordance with one or more embodiments of the invention.
Figure 6B:
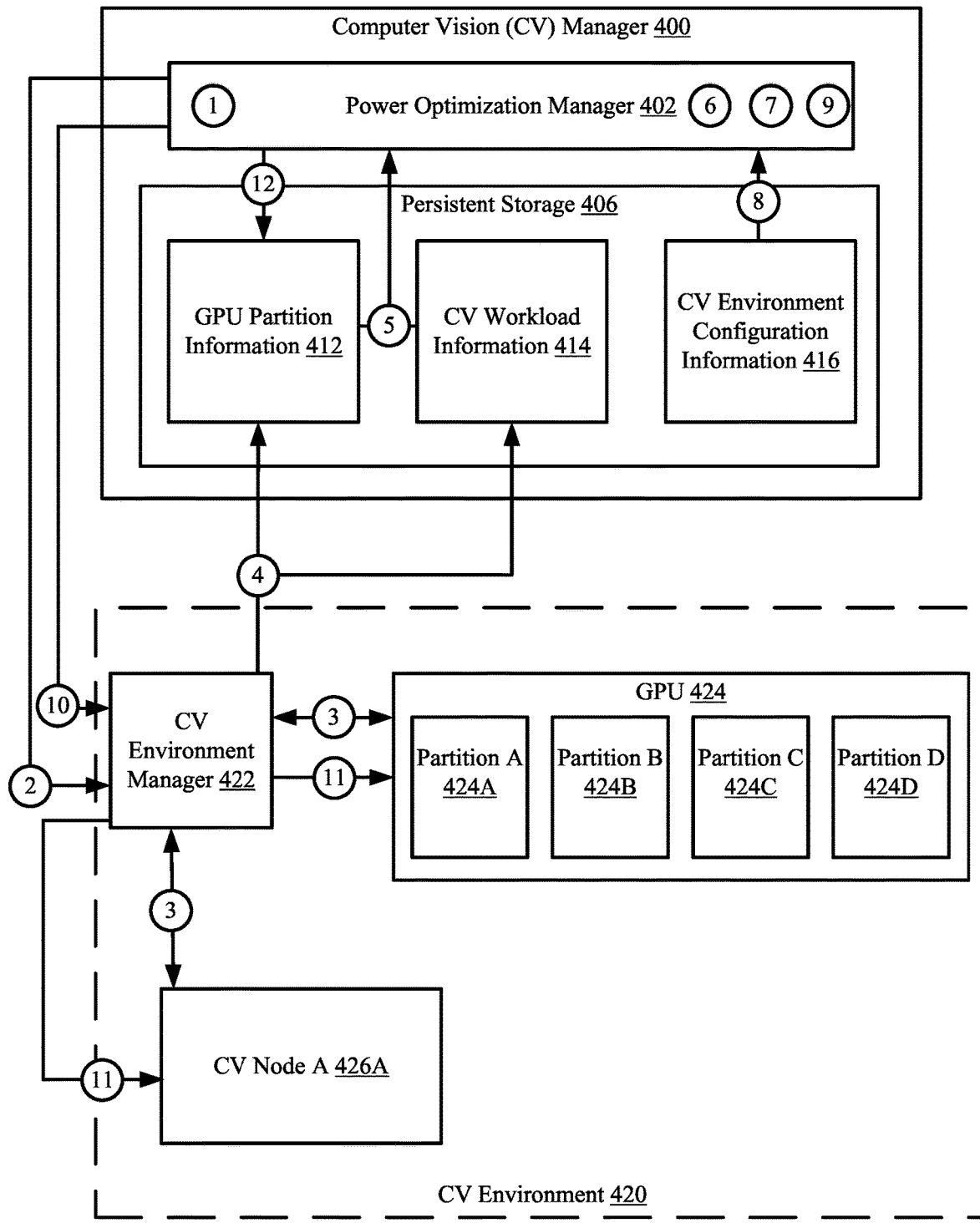

FIGS. 6A-6B show diagrams of a second example in accordance with one or more embodiments of the invention. Turning to FIG. 6A, consider a scenario in which a computer vision (CV) manager (400) performs GPU partition services for a CV environment (420). The CV manager (400) includes a GPU partition manager (404) and storage (406). The storage (406) includes GPU partition information (412), CV workload information (414), and CV environment configuration information (416). The CV environment (420) includes a CV environment manager (422), CV node A (426A), and a GPU (424) of CV node A (426A). The GPU (424) includes four logical partitions, partition A (424A), partition B (424B), partition C (424C), and partition D (424D). CV node A (426A) is currently using all partitions of the GPU (424A, 424B, 424C, 424D) to perform a previously provisioned CV workload.

At Step 1, the GPU partition manager (404) obtains a request to provision a CV workload based on an initial optimal GPU partition allocation. The CV workload is an object detection CV workload for detecting abandoned bags. The request to perform the CV workload includes CV workload information associated with the CV workload. The CV workload information specifies that the CV workload is an object detection CV workload. The CV workload information further specifies a video data complexity associated with the CV workload. At Step 2, the GPU partition manager (404) parses the request to obtain the CV workload information associated with the CV workload. At Step 3, the GPU partition manager (404) sends a request to the CV environment manager (422) of CV environment configuration information.

In response to obtaining the request, at Step 4, the CV environment manager (422) obtains CV environment configuration information associated with CV node A (426A) and the GPU (424). The CV node configuration information includes the CPU type, CPU core count, CPU utilization, the partition scheme associated with the GPU (424), the current allocations of the partitions (424A, 424B, 424C, 424C), memory type, and memory utilization associated with CV node A (426A). After obtaining the CV environment configuration information, at Step 5, the CV environment manager (422) updates the CV environment configuration information (416) in the storage (406) with the CV environment configuration information associated with CV node A (426A) and the GPU (424).

The CV environment manager (422) may notify the GPU partition manager (404) that CV environment configuration information associated with CV node A (426A) and the GPU (424) is included in the CV environment configuration information (416) of the storage (406). At Step 6, the GPU partition manager (404) then obtains the CV environment configuration information associated with CV node A (426A) and the GPU (424) from the storage (406).

At Step 7, the GPU partition manager (404) generates an initial optimal GPU partition allocation. The GPU partition manager (404) generates the initial optimal GPU partition allocation by applying a GPU partition model to the CV workload information and the CV environment configuration information. At Step 8, the GPU partition manager (404) determines that the CV workload should be allocated one GPU partition to execute the CV workload and a previously provisioned CV workload executing on CV node A (426A) should be allocated the other three GPU partitions based on the initial optimal GPU partition allocation.

Based on the determination, the GPU partition manager (404), at Step 9, initiates the performance of the CV workload using CV node A (426A) with one of the GPU partitions and reallocating the remaining three GPU partitions to the previously provisioned CV workload by sending a request to the CV environment manager (422). At step 10, the CV environment manager (422) allocates partition A (424A) to perform the CV workload. Additionally, the CV environment manager (422) allocates partition B (424B), partition C (424C), and partition D (424D) to the previously provisioned CV workload of CV node A (426A). As a result, CV node A (426A) uses partition A (424A) of the GPU (424) to perform the CV workload and partition B (424B), partition C (424C), and partition D (424D) of the GPU (424) to perform the previously provisioned CV workload.

Turning to FIG. 6B, consider a scenario in which a period of time has passed since Step 10 of FIG. 6A. At Step 1 of FIG. 6B, the GPU partition manager (404) identifies a real-time optimal GPU partition allocation event based on a GPU partition schedule. In response to identifying the real-time optimal GPU partition allocation event, at Step 2, the GPU partition manager (404) sends a request to the CV environment manager (422) for GPU partition information and CV workload information associated with the CV workloads executing on CV node A (426A). In response to obtaining the request, at Step 3, the CV environment manager (422) obtains updated GPU partition information and CV workload information associated with CV node A (426A).

At Step 4, the CV environment manager (422) stores the updated GPU partition information in the GPU partition information (412) and stores the updated CV workload information in the CV workload information (414) of the storage (406). At Step 5, after being notified that the GPU partition information (412) and the CV workload information (414) of the storage (406) has been updated, the GPU partition manager (404) obtains updated GPU partition information (412) and CV workload information (414) associated with CV node A (426A) and the GPU (424).

At Step 6, the GPU partition manager (404) generates a real-time optimal GPU partition allocation. The GPU partition manager (404) generates the real-time optimal GPU partition allocation by applying a GPU partition model to the CV workload information and the GPU partition information. The camera associated with CV node A (426A) was upgraded to capture video data with double the framerate. As a result, the video data complexity of the CV workload information associated with the object detection CV workload executing on CV node A (426A) increased. Therefore, the real-time optimal GPU partition allocation specifies a different GPU partition allocation to perform the CV workload.

Based on the real-time optimal GPU partition allocation, at Step 7, the GPU partition manager (404) determines that the real-time optimal GPU partition allocation indicates a GPU reconfiguration is required. In response to the determination, at Step 8, the GPU partition manager (404) obtains CV environment configuration information associated with the CV environment (420). The GPU partition manager (404), at Step 9, then determines that the pervious GPU allocations are not capable of performing their respective CV workloads based on the new optimal GPU partition allocation using the CV environment configuration information. At step 10, based on the determination, the GPU partition manager (404) sends a request to the CV environment manager (422) to reallocate the GPU partitions to allocate two GPU partitions to each CV workload executing on CV node A (426A). At step 11, the CV environment manager (422) allocates partition A (424A), and partition B (424B) to the CV workload provisioned in FIG. 6A, and allocates partition C (424C) and partition D (424D) to the previously provisioned CV workload. As a result, CV node A (426A) now uses partition A (424A) and partition B (424B) to execute the CV workload, and now uses partition C (424C) and partition D (424D) of the GPU (424) to perform the previously provisioned CV workload.

End of Second Example

Figure 7:
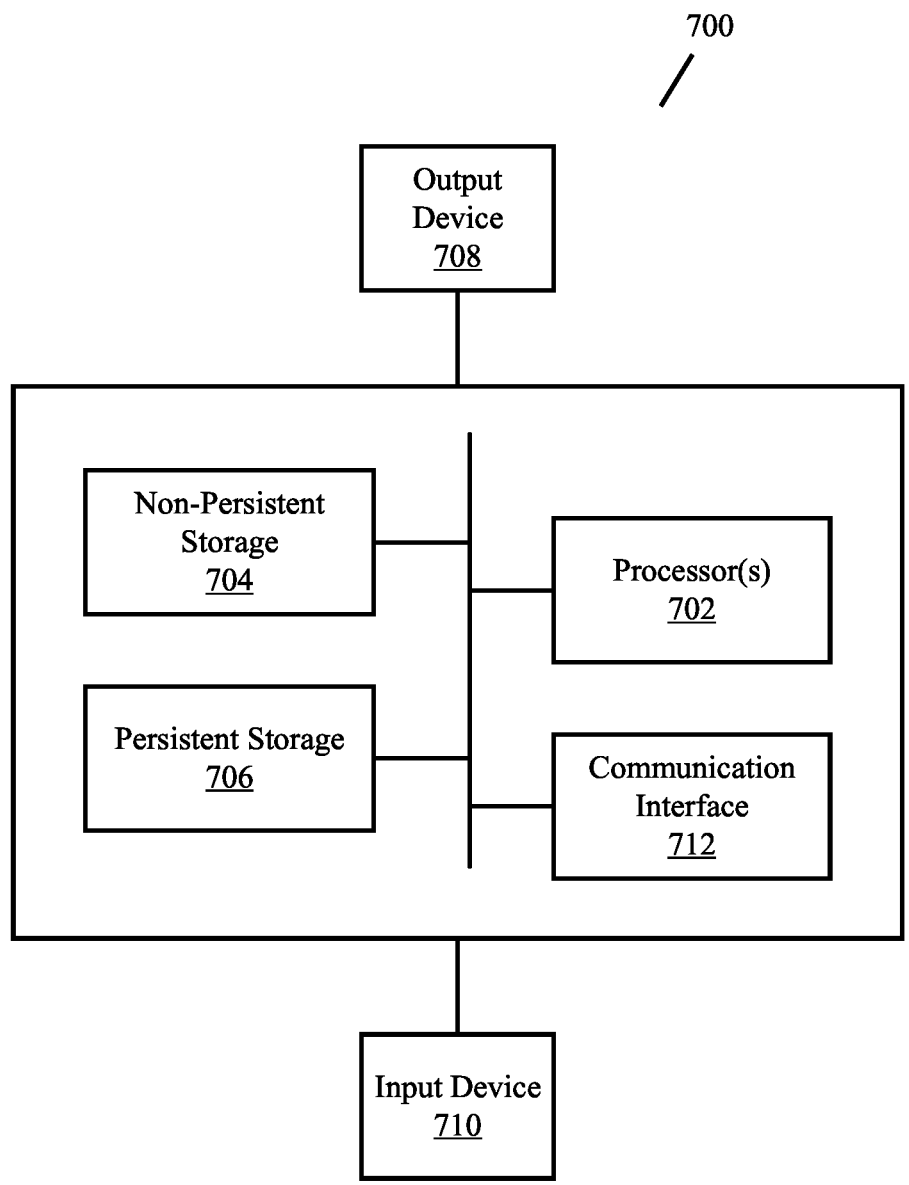
FIG. 7 shows a diagram of a computing device in accordance with one or more embodiments of the invention.

As discussed above, embodiments of the invention may be implemented using computing devices. FIG. 7 shows a diagram of a computing device in accordance with one or more embodiments of the invention. The computing device (700) may include one or more computer processors (702), non-persistent storage (704) (e.g., volatile memory, such as random access memory (RAM), cache memory), persistent storage (706) (e.g., a hard disk, an optical drive such as a compact disk (CD) drive or digital versatile disk (DVD) drive, a flash memory, etc.), a communication interface (712) (e.g., Bluetooth interface, infrared interface, network interface, optical interface, etc.), input devices (710), output devices (708), and numerous other elements (not shown) and functionalities. Each of these components is described below.

In one embodiment of the invention, the computer processor(s) (702) may be an integrated circuit for processing instructions. For example, the computer processor(s) may be one or more cores or micro-cores of a processor. The computing device (700) may also include one or more input devices (710), such as a touchscreen, keyboard, mouse, microphone, touchpad, electronic pen, or any other type of input device. Further, the communication interface (712) may include an integrated circuit for connecting the computing device (700) to a network (not shown) (e.g., a local area network (LAN), a wide area network (WAN) such as the Internet, mobile network, or any other type of network) and/or to another device, such as another computing device.

In one embodiment of the invention, the computing device (700) may include one or more output devices (708), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (702), non-persistent storage (704), and persistent storage (706). Many different types of computing devices exist, and the aforementioned input and output device(s) may take other forms.

One or more embodiments of the invention may be implemented using instructions executed by one or more processors of the data management device. Further, such instructions may correspond to computer readable instructions that are stored on one or more non-transitory computer readable mediums.

One or more embodiments of the invention may improve the operation of one or more computing devices. More specifically, embodiments of the invention relate to allocating GPU partitions to CV nodes to execute CV workloads in a CV environment. A CV manager may generate optimal GPU partition allocations to allocate GPU partitions to allocate GPU partitions CV nodes of a CV environment based on CV workload information associated with the CV workloads using a GPU partition model. Additionally, as CV workloads and/or the CV nodes of the CV environment change, the GPU partitions may be dynamically reallocated to CV nodes in real-time. As a result, GPU partitions may be efficiently allocated and reallocated in the CV environment. Therefore, the performance of the CV environment may be optimized and the negative effects a changing CV environment may be reduced.

Thus, embodiments of the invention may address the problem of inefficient use of computing resources to perform CV workloads. This problem arises due to the technological nature of the environment in which the CV workloads are performed.

The problems discussed above should be understood as being examples of problems solved by embodiments of the invention disclosed herein and the invention should not be limited to solving the same/similar problems. The disclosed invention is broadly applicable to address a range of problems beyond those discussed herein.

While the invention has been described with respect to a limited number of embodiments, those skilled in the art, having benefit of this disclosure, will appreciate that other embodiments can be devised which do not depart from the scope of the technology as disclosed herein. Accordingly, the scope of the invention should be limited only by the attached claims.

What is claimed is:

1. A method for allocating graphics processing unit partitions for a computer vision environment, the method comprising:
    obtaining, by a computer vision (CV) manager, an initial graphics processing unit (GPU) partition allocation request associated with a CV workload;
    in response to obtaining the initial GPU partition allocation request:
        obtaining CV workload information associated with the CV workload including video data complexity, CV workload type, and CV workload vendor, wherein the CV workload information specifies a plurality of CV nodes that comprise the CV environment and wherein the CV workload information specifies CV nodes of the plurality of CV nodes which may perform the CV workload;
        obtaining first CV environment configuration information associated with the GPU partition allocation request, wherein the CV environment configuration information specifies:
            the plurality of CV nodes, and
            CV node characteristics including central processing unit (CPU) types, CPU utilization, and memory capacity and utilization associated with the plurality of CV nodes;
        generating an optimal GPU partition allocation by executing a machine learning model, wherein the machine learning model is one of a plurality of models in a GPU partition model, wherein:

the first CV environment configuration information and the CV workload information are inputs for the machine learning model, and
the optimal GPU partition allocation specifies:
a CV node of the plurality of CV nodes to perform the CV workload,
a GPU partition to allocate to a plurality of CV workloads executing on the CV node of the plurality of CV nodes to perform the CV workload,
the plurality of CV workloads comprises the CV workload, and
GPU partition information including GPU operations per second, GPU partition utilization, and GPU partition temperature; and
initiating performance of the CV workload in a CV environment based on the optimal GPU partition allocation.

2. The method of claim 1, further comprising:
identifying, by the CV manager, a real-time GPU partition allocation event;
in response to identifying the real-time GPU partition allocation event:
obtaining second CV workload information associated with the CV environment, wherein the CV environment comprises the plurality of CV nodes that execute the plurality of CV workloads;
obtaining the GPU partition information associated with the CV environment, wherein the GPU partition information specifies a plurality of GPU partitions allocated to the plurality of CV nodes;
generating a real-time optimal GPU partition allocation based on the GPU partition information and the CV workload information using the GPU partition model;
making a determination that the real-time optimal GPU partition allocation indicates a GPU reconfiguration is required; and
in response to the determination:
obtaining second CV environment configuration information; and
reallocating at least a portion of the plurality of GPU partitions to the CV nodes based on the second CV environment configuration information and the real-time optimal GPU partition allocation.

3. The method of claim 2, wherein the real-time optimal GPU partition allocation specifies an optimal allocation of the plurality of GPU partitions to the plurality of CV nodes.

4. A non-transitory computer readable medium comprising computer readable program code, which when executed by a computer processor enables the computer processor to perform a method for allocating graphics processing unit partitions for a computer vision environment, the method comprising:
obtaining, by a computer vision (CV) manager, an initial graphics processing unit (GPU) partition allocation request associated with a CV workload;
in response to obtaining the initial GPU partition allocation request:
obtaining CV workload information associated with the CV workload including video data complexity, CV workload type, and CV workload vendor, wherein the CV workload information specifies a plurality of CV nodes that comprise the CV environment and wherein the CV workload information specifies CV nodes of the plurality of CV nodes which may perform the CV workload;
obtaining first CV environment configuration information associated with the GPU partition allocation request, wherein the CV environment configuration information specifies:
the plurality of CV nodes, and
CV node characteristics including central processing unit (CPU) types, CPU utilization, and memory capacity and utilization associated with the plurality of CV nodes;
generating an optimal GPU partition allocation by executing a machine learning model, wherein the machine learning model is one of a plurality of models in a GPU partition model, wherein;
the first CV environment configuration information and the CV workload information are inputs for the machine learning model, and
the optimal GPU partition allocation specifies: a CV node of the plurality of CV nodes to perform the CV workload, a GPU partition to allocate to a plurality of CV workloads executing on the CV node of the plurality of CV nodes to perform the CV workload, the plurality of CV workloads comprises the CV workload, and
GPU partition information including GPU operations per second, GPU partition utilization, and GPU partition temperature; and
initiating performance of the CV workload in a CV environment based on the optimal GPU partition allocation.

5. The non-transitory computer readable medium of claim 4, wherein the method further comprising:
identifying, by the CV manager, a real-time GPU partition allocation event;
in response to identifying the real-time GPU partition allocation event:
obtaining second CV workload information associated with the CV environment, wherein the CV environment comprises the plurality of CV nodes that execute the plurality of CV workloads;
obtaining the GPU partition information associated with the CV environment, wherein the GPU partition information specifies a plurality of GPU partitions allocated to the plurality of CV nodes;
generating a real-time optimal GPU partition allocation based on the GPU partition information and the CV workload information using the GPU partition model;
making a determination that the real-time optimal GPU partition allocation indicates a GPU reconfiguration is required; and
in response to the determination:
obtaining second CV environment configuration information; and
reallocating at least a portion of the plurality of GPU partitions to the CV nodes based on the second CV environment configuration information and the real-time optimal GPU partition allocation.

6. The non-transitory computer readable medium of claim 5, wherein the real-time optimal GPU partition allocation specifies an optimal allocation of the plurality of GPU partitions to the plurality of CV nodes.

7. A system, comprising:
a computer vision (CV) environment comprising a plurality of CV nodes; and
a CV manager, comprising a processor and memory, programmed to:

obtain an initial graphics processing unit (GPU) partition allocation request associated with a CV workload;

in response to obtaining the initial GPU partition allocation request:
  obtain CV workload information associated with the CV workload including video data complexity, CV workload type, and CV workload vendor, wherein the CV workload information specifies the plurality of CV nodes that comprise the CV environment and wherein the CV workload information specifies CV nodes of the plurality of CV nodes which may perform the CV workload;
  obtain first CV environment configuration information associated with the initial GPU partition allocation request, wherein the CV environment configuration information specifies:
    the plurality of CV nodes, and
    CV node characteristics including central processing unit (CPU) types, CPU utilization, and memory capacity and utilization associated with the plurality of CV nodes;
  generate an optimal GPU partition allocation by executing a machine learning model, wherein the machine learning model is one of a plurality of models in a GPU partition model, wherein:
    the first CV environment configuration information and the CV workload information are inputs for the machine learning model, and
    the optimal GPU partition allocation specifies: a CV node of the plurality of CV nodes to perform the CV workload, a GPU partition to allocate to a plurality of CV workloads executing on the CV node of the plurality of CV nodes to perform the CV workload, the plurality of CV workloads comprises the CV workload, and GPU partition information including GPU operations per second, GPU partition utilization, and GPU partition temperature; and
  initiate performance of the CV workload in the CV environment based on the optimal GPU partition allocation.

8. The system of claim 7, wherein the CV manager is further programmed to:
  identify a real-time GPU partition allocation event;
  in response to identifying the real-time GPU partition allocation event:
    obtain second CV workload information associated with the CV environment, wherein the CV environment comprises the plurality of CV nodes that execute the plurality of CV workloads;
    obtain the GPU partition information associated with the CV environment, wherein the GPU partition information specifies a plurality of GPU partitions allocated to the plurality of CV nodes;
    generate a real-time optimal GPU partition allocation based on the GPU partition information and the CV workload information using the GPU partition model;
    make a determination that the real-time optimal GPU partition allocation indicates a GPU reconfiguration is required; and
    in response to the determination:
      obtain second CV environment configuration information; and
      reallocate at least a portion of the plurality of GPU partitions to the CV nodes based on the second CV environment configuration information and the real-time optimal GPU partition allocation.

* * * * *